US011658901B2

(12) United States Patent
Menon et al.

(10) Patent No.: US 11,658,901 B2
(45) Date of Patent: May 23, 2023

(54) POINT-TO-MULTIPOINT LAYER-2 NETWORK EXTENSION OVER LAYER-3 NETWORK

(71) Applicant: Juniper Networks, Inc., Sunnyvale, CA (US)

(72) Inventors: Abilash Menon, Boxborough, MA (US); Anna Yungelson, Lexington, MA (US); Scott A. McCulley, Burlington, MA (US); Jacob Dionne, Bedford, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 17/357,743

(22) Filed: Jun. 24, 2021

(65) Prior Publication Data

US 2021/0409322 A1    Dec. 30, 2021

Related U.S. Application Data

(60) Provisional application No. 63/043,423, filed on Jun. 24, 2020, provisional application No. 63/043,426, (Continued)

(51) Int. Cl.
*H04L 45/24* (2022.01)
*H04L 45/00* (2022.01)
(Continued)

(52) U.S. Cl.
CPC .......... *H04L 45/24* (2013.01); *H04L 12/4641* (2013.01); *H04L 45/16* (2013.01);
(Continued)

(58) Field of Classification Search
CPC ..... H04L 45/24; H04L 12/4641; H04L 45/16; H04L 45/20; H04L 45/42; H04L 45/566;
(Continued)

(56) References Cited

U.S. PATENT DOCUMENTS 6,108,710 A    8/2000  Brabson et al.
6,507,577 B1   1/2003  Mauger et al.
(Continued)

FOREIGN PATENT DOCUMENTS

EP    1185041 A2    3/2002
EP    2124385 A1    11/2009
(Continued)

OTHER PUBLICATIONS (No Author) 128 Technology, "Session Smart Routing™: How it Works," Technical Whitepaper, 15 pages (Mar. 2018).
(Continued)

*Primary Examiner* — Patrice L Winder
(74) *Attorney, Agent, or Firm* — Shumaker & Sieffert, P.A.

(57) ABSTRACT

Techniques are disclosed for session-based routing of multipoint Open Systems Interconnection (OSI) Model Layer-2 (L2) frames of an L2 network extended over Layer-3 (L3) networks. In one example, L2 networks connect a source device to an ingress router and receiver devices to egress routers. An L3 network connects the ingress and egress routers. The ingress router receives, from the source device, a multipoint L2 frame destined for the receiver devices. The ingress router forms, for each egress router that is connected to at least one multipoint receiver device, a unicast L3 packet for the L2 frame and forwards the unicast L3 packet to the egress router. Each egress router generates, in response to receiving the unicast L3 packet, the multipoint L2 frame and forwards, to the receiver devices, the multipoint L2 frame.

20 Claims, 7 Drawing Sheets

Related U.S. Application Data filed on Jun. 24, 2020, provisional application No. 63/043,416, filed on Jun. 24, 2020.

(51) Int. Cl.
| | |
|---|---|
| *H04L 45/42* | (2022.01) |
| *H04L 45/745* | (2022.01) |
| *H04L 45/16* | (2022.01) |
| *H04L 61/103* | (2022.01) |
| *H04L 101/622* | (2022.01) |
| *H04L 67/146* | (2022.01) |
| *H04L 12/46* | (2006.01) |

(52) U.S. Cl.
CPC .............. *H04L 45/42* (2013.01); *H04L 45/66* (2013.01); *H04L 45/745* (2013.01); *H04L 61/103* (2013.01); *H04L 67/146* (2013.01); *H04L 2101/622* (2022.05)

(58) Field of Classification Search
CPC ..... H04L 45/66; H04L 45/745; H04L 61/103; H04L 61/6022; H04L 67/146; H04L 67/2804; H04L 45/38; H04L 45/72; H04L 45/74; H04L 47/2483; H04L 49/354; H04L 12/46

See application file for complete search history.

(56) References Cited

U.S. PATENT DOCUMENTS

| | | | |
|---|---|---|---|
| 6,563,835 | B1 | 5/2003 | Chen |
| 6,587,438 | B1 | 7/2003 | Brendel |
| 6,982,966 | B2 | 1/2006 | Eidenschink et al. |
| 8,576,844 | B1* | 11/2013 | Ghosh .................. H04L 61/103 |
| | | | 370/390 |
| 9,729,439 | B2 | 8/2017 | MeLampy et al. |
| 9,729,682 | B2 | 8/2017 | Kumar et al. |
| 9,762,485 | B2 | 9/2017 | Kaplan et al. |
| 9,871,748 | B2 | 1/2018 | Gosselin et al. |
| 9,985,883 | B2 | 5/2018 | MeLampy et al. |
| 10,200,264 | B2 | 2/2019 | Menon et al. |
| 10,277,506 | B2 | 4/2019 | Timmons et al. |
| 10,432,522 | B2 | 10/2019 | Kaplan et al. |
| 11,005,749 | B2 | 5/2021 | Kaplan et al. |
| 11,070,465 | B2 | 7/2021 | Kaplan et al. |
| 11,075,824 | B2 | 7/2021 | McCulley et al. |
| 11,165,863 | B1 | 11/2021 | Timmons et al. |
| 2003/0133450 | A1 | 7/2003 | Baum |
| 2005/0114656 | A1 | 5/2005 | Liu et al. |
| 2006/0062214 | A1 | 3/2006 | Ng et al. |
| 2007/0008949 | A1 | 1/2007 | Balandin |
| 2007/0058638 | A1 | 3/2007 | Guichard et al. |
| 2007/0177511 | A1 | 8/2007 | Das et al. |
| 2008/0062891 | A1 | 3/2008 | Van der Merwe et al. |
| 2008/0170570 | A1 | 7/2008 | Moskaluk et al. |
| 2009/0097418 | A1 | 4/2009 | Castillo et al. |
| 2009/0116404 | A1 | 5/2009 | Mahop et al. |
| 2010/0043067 | A1 | 2/2010 | Varadhan et al. |
| 2011/0032844 | A1 | 2/2011 | Patel et al. |
| 2012/0069740 | A1 | 3/2012 | Lu et al. |
| 2012/0281520 | A1 | 11/2012 | Ansari et al. |
| 2013/0089093 | A1 | 4/2013 | Bacthu et al. |
| 2013/0107725 | A1* | 5/2013 | Jeng .......................... H04L 45/16 |
| | | | 370/248 |
| 2013/0219035 | A1 | 8/2013 | Detienne et al. |
| 2014/0010117 | A1 | 1/2014 | Lindem, III et al. |
| 2014/0129735 | A1 | 5/2014 | Thyni et al. |
| 2014/0195666 | A1 | 7/2014 | Dumitriu et al. |
| 2014/0355415 | A1 | 12/2014 | Mandal et al. |
| 2015/0381515 | A1 | 12/2015 | Mattson et al. |
| 2016/0321341 | A1 | 11/2016 | Ramamurthi |
| 2016/0352631 | A1 | 12/2016 | Medved et al. |
| 2017/0250906 | A1 | 8/2017 | MeLampy et al. |
| 2017/0331694 | A1 | 11/2017 | Crickett et al. |
| 2017/0339046 | A1 | 11/2017 | Gast et al. |
| 2017/0346691 | A1 | 11/2017 | Crickett et al. |
| 2018/0041555 | A1 | 2/2018 | Manohar et al. |
| 2018/0062932 | A1 | 3/2018 | Cohn et al. |
| 2018/0102965 | A1 | 4/2018 | Hari et al. |
| 2018/0314706 | A1 | 11/2018 | Sirton et al. |
| 2019/0028577 | A1 | 1/2019 | D'Souza et al. |
| 2019/0104206 | A1 | 4/2019 | Goel et al. |
| 2019/0109770 | A1 | 4/2019 | Pugaczewski |
| 2019/0116053 | A1 | 4/2019 | Allan |
| 2019/0155935 | A1 | 5/2019 | Walker |
| 2020/0106640 | A1 | 4/2020 | Labonte et al. |
| 2020/0314016 | A1* | 10/2020 | Dutta ....................... H04L 45/16 |
| 2020/0366589 | A1 | 11/2020 | Kaplan et al. |
| 2020/0366590 | A1 | 11/2020 | Kaplan et al. |
| 2020/0366593 | A1 | 11/2020 | Kaplan et al. |
| 2020/0366594 | A1 | 11/2020 | Kaplan et al. |
| 2020/0366598 | A1 | 11/2020 | Kaplan et al. |
| 2020/0366599 | A1 | 11/2020 | Kaplan et al. |
| 2020/0403890 | A1 | 12/2020 | McCulley et al. |
| 2021/0211324 | A1* | 7/2021 | Dutta ................... H04L 12/4641 |
| 2021/0243111 | A1* | 8/2021 | Dutta ....................... H04L 45/16 |
| 2021/0409323 | A1* | 12/2021 | Menon ................ H04L 12/4641 |
| 2022/0200915 | A1 | 6/2022 | Timmons |
| 2023/0008913 | A1 | 1/2023 | Menon et al. |
| 2023/0009482 | A1 | 1/2023 | Menon et al. |

FOREIGN PATENT DOCUMENTS

| | | |
|---|---|---|
| EP | 1741247 B1 | 4/2012 |
| EP | 3198822 A1 | 8/2017 |

OTHER PUBLICATIONS (No Author) 128 Technology, Application Classification Solution Note, 11 pages (Aug. 2017).
(No Author) 128 Technology, Failsafe Delivery Whitepaper, 13 pages (Sep. 2017).
(No Author) 128 Technology, Hypersegmentation Under the Hood Whitepaper, 9 pages (Aug. 2018).
(No Author) 128 Technology, Multipoint Secure Vector Routing Whitepaper, 9 pages (Jun. 2017).
(No Author) 128 Technology, Network Security with 128 Networking Platform Whitepaper, 12 pages (Sep. 2019).
(No Author) 128 Technology, Quality of Service Whitepaper, 6 pages (Oct. 2019).
(No Author) 128 Technology, Resiliency Whitepaper, 9 pages (Sep. 2017).
(No Author) 128 Technology, Step Solution Note, 9 pages (Aug. 2017).
(No Author) Enhanced Interior Gateway Routing Protocol (EIGRP) Wide Metrics Whitepaper, Cisco, 14 pages (Feb. 2016).
Atlas A., et al., "Performance Based Path Selection for Explicitly Routed Label Switched Paths (LSPs) Using TE Metric Extensions," 10 pages (May 2016).
Berners-Lee et al. "Uniform Resource Identifier (URI): Generic Syntax," Network Working Group; RFC 3986, Jan. 2005, 62 pp.
Bryan et al., "JavaScript Object Notation {JSON} Patch," Internet Engineering Task Force (IETF); RFC 6902, Apr. 2013, 19 pp.
Caria M., et al., "SDN Partitioning: A Centralized Control Plane for Distributed Routing Protocols," Preliminary Version / Preprint, 14 pages (Apr. 2016).
Cordero JA, "Link-State Routing Optimization for Compound Autonomous Systems in the Internet," 77 pages (2011). Applicant points out in accordance with MPEP 609.04(a) that the 2011 year of publication is sufficiently earlier than the effective U.S. filing date of the present application, and any foreign priority date that the particular month of publication is not in issue.
Crawley E., et al., "A Framework for QoS-based Routing in the Internet," 37 pages (Aug. 1998).
Ferro G., "Response: Distributed? Centralized? Both?—Cisco Blog on OnePK and SDN," Blog Post, 7 pages (Jul. 2012).
Filsfils C., "Segment Routing Architecture," Internet Engineering Task Force (IETF), 32 pages (Jul. 2018).

(56) References Cited

OTHER PUBLICATIONS

George W., et al., Time Warner Cable et al., "Autonomous System Migration Mechanisms and Their Effects on the BGP AS_PATH Attribute," 16 pages (Nov. 2015).
IP Performance Measurement (ippm) documents, 15 pages (retrieved from: https://datatracker.ietf.org/wg/ippm/documents/) (Jun. 2020).
Rekhter Y., et al., Chrysler Corp., et al., "Address Allocation for Private Internets," 9 pages (Feb. 1996).
Sollins et al., "Functional Requirements for Uniform Resource Names," Network Working Group; RFC 1737, Dec. 1994, 7 pp.
Vissicchio S., et al., "Central Control over Distributed Routing," 14 pages (Aug. 2015).
Wijnands I.J., et al., Cisco Systems, et al., "PIM Flooding Mechanism (PFM) and Source Discovery (SD)," 18 pages (Mar. 2018).
Younis O., et al., "Constraint-Based Routing in the Internet: Basic Principles and Recent Research," IEEE Communications Surveys and Tutorials, vol. 5, Issue No. 1, Third Quarter, 15 pages (2003) Applicant points out in accordance with MPEP 609.04(a) that the 2003 year of publication is sufficiently earlier than the effective U.S. filing date of the present application, and any foreign priority date that the particular month of publication is not in issue.
Postel, "User Datagram Protocol," RFC 768, Aug. 28, 1980, 3 pp.
"Transmission Control Protocol," DARPA Internet Program Protocol Specification, Information Sciences Institute, RFC 793, Sep. 1981, 91 pp.
U.S. Appl. No. 17/314,268, filed May 7, 2021, naming inventors Kaplan et al.
U.S. Appl. No. 17/304,420, filed Jun. 21, 2021, naming inventors Kaplan et al.
U.S. Appl. No. 17/357,790, filed Jun. 24, 2021, naming inventors Menon et al.
U.S. Appl. No. 17/357,763, filed Jun. 24, 2021, naming inventors Menon et al.
International Search Report and Written Opinion of International Application No. PCT/US2021/038984, dated Oct. 18, 2021, 15 pp.
Sajassi et al., "Integrated Routing and Bridging in EVPN, draft-ietf-bess-evpn-inter-subnet-forwarding-01," Internet-Draft, L2VPN Workgroup, Oct. 18, 2015, 26 pp.
Hao et al., "TRILL Integrated Routing and Bridging Solution; draft-hao-trill-irb-02.txt," Internet Draft, Jul. 12, 2013, 10 pp.
"Juniper Networks EVPN Implementation for Next-Generation Data Center Architectures," Juniper Networks; White Paper, Jul. 2015, 62 pp.
International Preliminary Report on Patentability from International Application No. PCT/US2021/038984 dated Jan. 5, 2023, 8 pp.

\* cited by examiner

POINT-TO-MULTIPOINT LAYER-2 NETWORK EXTENSION OVER LAYER-3 NETWORK

This application claims the benefit of U.S. Provisional Application No. 63/043,416, filed on Jun. 24, 2020, U.S. Provisional Application No. 63/043,426, filed on Jun. 24, 2020, and U.S. Provisional Application No. 63/043,423, filed on Jun. 24, 2020, the entire content of each of which is incorporated herein by reference.

TECHNICAL FIELD

This disclosure generally relates to computer networks, and, more specifically, routing packets within computer networks.

BACKGROUND

A computer network is a collection of interconnected computing devices that can exchange data and share resources. Example computing devices include routers, switches, and other Layer 2 (L2) network devices that operate within Layer 2 of the Open Systems Interconnection (OSI) reference model, i.e., the data link layer, and Layer 3 (L3) network devices that operate within Layer 3 of the OSI reference model, i.e., the network layer. Network devices within computer networks often include a control unit that provides control plane functionality for the network device and forwarding components for routing or switching data units.

The computing devices may establish a "network session" (also referred to herein as "session") to enable communication between devices on a computer network. A session may be bidirectional in that the session includes packets traveling in both directions between a first device and a second device. For example, a session includes a forward packet flow originating from a first device and destinated for a second device and a reverse packet flow originating from the second device and destined for the first device. The forward and reverse packet flows of the session are related to one another in that the source address and source port of the forward packet flow is the same as the destination address and destination port of the reverse packet flow, and the destination address and destination port of the forward packet flow is the same as the source address and source port of the reverse packet flow. To establish a session, computing devices may use one or more communication session protocols including Transmission Control Protocol (TCP), Transport Layer Security (TLS), User Datagram Protocol (UDP), Internet Control Message Protocol (ICMP), etc.

SUMMARY

In general, the disclosure describes techniques for session-based routing of Open Systems Interconnection (OSI) Model Layer-2 (L2) frames of a multipoint L2 network extended over Layer-3 (L3) networks. In one example, a first L2 network connects a source device of the multipoint network (referred to herein as "multipoint source device") to an ingress router of a plurality of routers, and one or more other L2 networks connects one or more receiver devices to one or more egress routers of the plurality of routers. The plurality of routers form an L3 network. Typically, the plurality of routers may provide session-based routing.

In a typical implementation of an L2 network extended over an L3 network, an ingress router which receives an L2 frame encapsulates the L2 frame with an L3 packet, and forwards a copy of the L3 packet toward each receiver device to which the L2 frame is destined. However, where multiple receiver devices are connected to the same egress router of the L3 network, the ingress router forwards multiple, redundant copies of the same L3 packet to the same egress router. This may cause substantial consumption of resources of the L3 network, especially where a single L2 frame of the multipoint network specifies a large number of receiver devices, each of which are connected to the same egress router.

An ingress router as described herein receives, from a multipoint source device, an L2 frame (referred to herein as "multipoint L2 frame") destined for one or more receiver devices. In some examples, the multipoint L2 frame is an Ethernet broadcast frame, an unknown unicast Ethernet frame, or an Ethernet multicast frame, also referred to as L2 "BUM" traffic. The ingress router determines one or more egress routers that are connected to the one or more receiver devices via one or more second L2 networks. The ingress router forms a different unicast session with each egress router determined to be connected to at least one receiver device. As part of the unicast session between the ingress router and each egress router determined to be connected to at least one receiver device, the ingress router generates a unicast L3 packet for the multipoint L2 frame and sends the unicast L3 packet to the egress router. The unicast L3 packet may comprise an L3 header, a session identifier for the unicast L3 packet, and an L3 payload. The L3 header may specify a source Internet Protocol (IP) address and a source port of the ingress router and a destination IP address and a destination port of a next-hop peer router of the plurality of routers that is a next hop toward the egress router. The session identifier identifies a session between the ingress router and the egress router. Each egress router generates, based on the received unicast L3 packet, the multipoint L2 frame and forwards the multipoint L2 frame to each receiver device to which the egress router is connected.

The techniques of the disclosure may provide specific improvements to the computer-related field of computer networking that have practical applications. For example, the techniques of the disclosure may enable an ingress router of an L3 network to receive a multipoint L2 frame and forward only a single L3 packet for the multipoint frame for each egress router that is connected to at least one receiver device of the multipoint L2 frame. Thus, such routers as described herein may reduce the number of L3 packets replicated for the multipoint L2 frame, thereby reducing the consumption of resources and increasing the scalability of the L3 network. Additionally, the techniques of the disclosure may enable a router to apply L3 session-based routing techniques to multipoint L2 frames, such as traffic engineering, failover operations, and stateful services. Therefore, the techniques of the disclosure may improve the reliability and redundancy of multipoint L2 frames for an L2 network extended across an L3 network.

In one example, this disclosure describes a method comprising: receiving, by an ingress router of a plurality of routers and from a source device connected to the ingress router via a first Open Systems Interconnection (OSI) Model Layer-2 (L2) network, a multipoint L2 frame destined for one or more receiver devices, the multipoint L2 frame comprising an L2 header and an L2 payload, wherein the plurality of routers form an OSI Model Layer-3 (L3) network; determining, by the ingress router and based on the L2 header of the multipoint L2 frame, one or more egress routers of the plurality of routers that are connected to the one or more receiver devices via one or more second L2 networks; generating, by the ingress router and for each egress router of the determined one or more egress routers that are connected to the one or more receiver devices, a unicast L3 packet comprising: an L3 header specifying a source Internet Protocol (IP) address and a source port of the ingress router and a destination IP address and a destination port of a next-hop peer router of the plurality of routers that is a next hop toward the egress router; a session identifier for the unicast L3 packet, the session identifier identifying a session between the ingress router and the egress router; and an L3 payload; and forwarding, by the ingress router, for each egress router of the determined one or more egress routers that are connected to the one or more receiver devices, and to the corresponding next-hop peer router of the plurality of routers, the generated unicast L3 packet corresponding to the egress router.

In another example, this disclosure describes an ingress router of a plurality of routers, the ingress router comprising processing circuitry configured to: receive, from a source device connected to the ingress router via a first Open Systems Interconnection (OSI) Model Layer-2 (L2) network, a multipoint L2 frame destined for one or more receiver devices, the multipoint L2 frame comprising an L2 header and an L2 payload, wherein the plurality of routers form an OSI Model Layer-3 (L3) network; determine, based on the L2 header of the multipoint L2 frame, one or more egress routers of the plurality of routers that are connected to the one or more receiver devices via one or more second L2 networks; generate, for each egress router of the determined one or more egress routers that are connected to the one or more receiver devices, a unicast L3 packet comprising: an L3 header specifying a source Internet Protocol (IP) address and a source port of the ingress router and a destination IP address and a destination port of a next-hop peer router of the plurality of routers that is a next hop toward the egress router; a session identifier for the unicast L3 packet, the session identifier identifying a session between the ingress router and the egress router; and an L3 payload; and forward, for each egress router of the determined one or more egress routers that are connected to the one or more receiver devices, and to the corresponding next-hop peer router of the plurality of routers, the generated unicast L3 packet corresponding to the egress router.

In another example, this disclosure describes a method comprising: receiving, by an egress router of a plurality of routers and from a previous-hop router of the plurality of routers that is a previous hop toward an ingress router of the plurality of routers, a unicast an Open Systems Interconnection (OSI) Model Layer-3 (L3) packet, wherein the plurality of routers form an L3 network, and wherein the unicast L3 packet comprises: an L3 header specifying a source Internet Protocol (IP) address and a source port of the previous-hop router and a destination IP address and a destination port of the egress router; a session identifier for the unicast L3 packet, the session identifier identifying a session between the ingress router and the egress router; and an L3 payload; and generating, in response to receiving the unicast L3 packet, a multipoint OSI Model Layer-2 (L2) frame destined for one or more receiver devices connected to the egress router via an L2 network, the multipoint L2 frame comprising an L2 header and an L2 payload; and forwarding, by the egress router and to each receiver device of the one or more receiver devices, the multipoint L2 frame.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

Like reference characters refer to like elements throughout the figures and description.

DETAILED DESCRIPTION

Figure 1A:
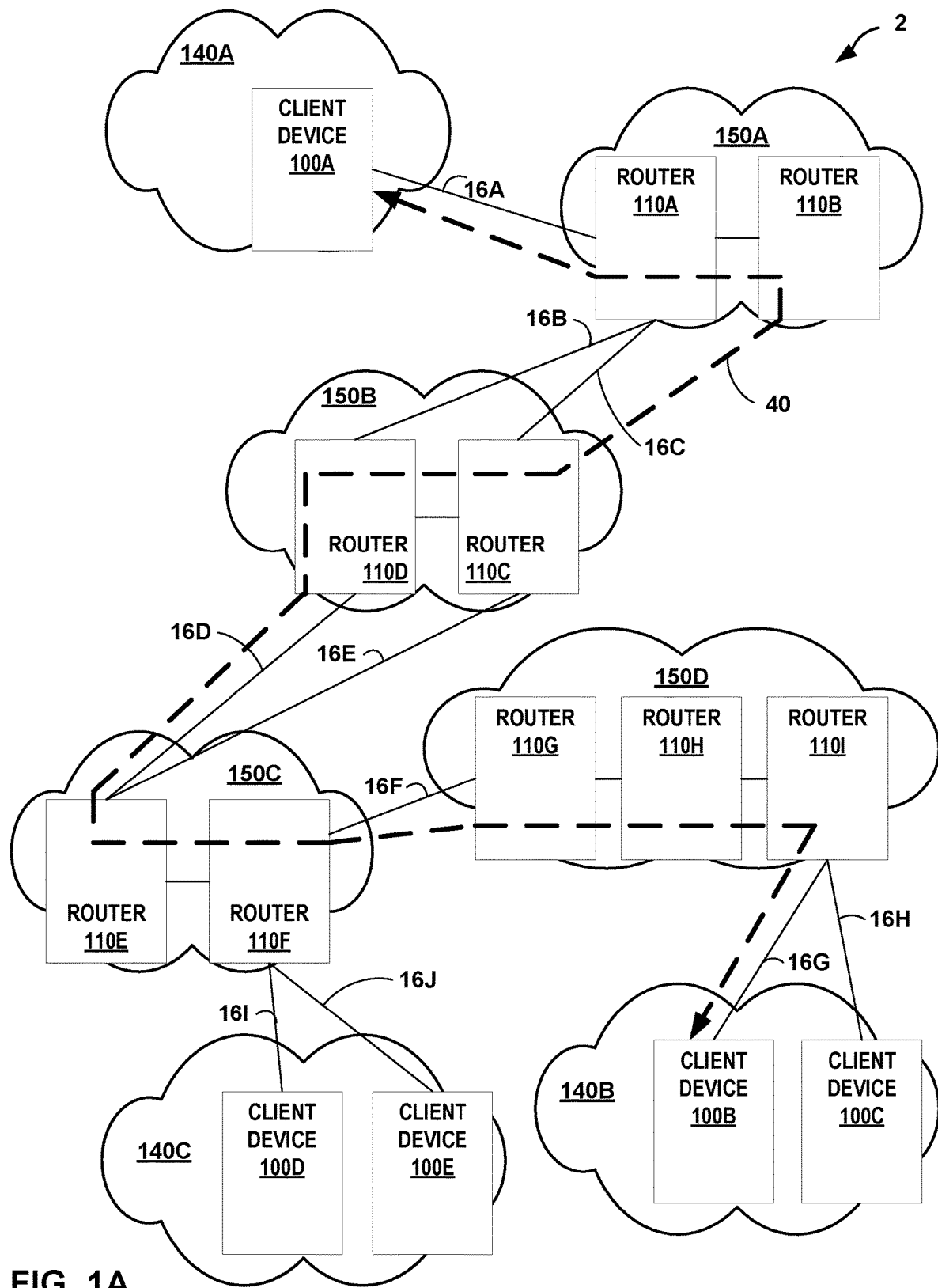
FIGS. 1A-1B are block diagrams illustrating an example computer network system in accordance with the techniques of the disclosure.
Figure 1B:
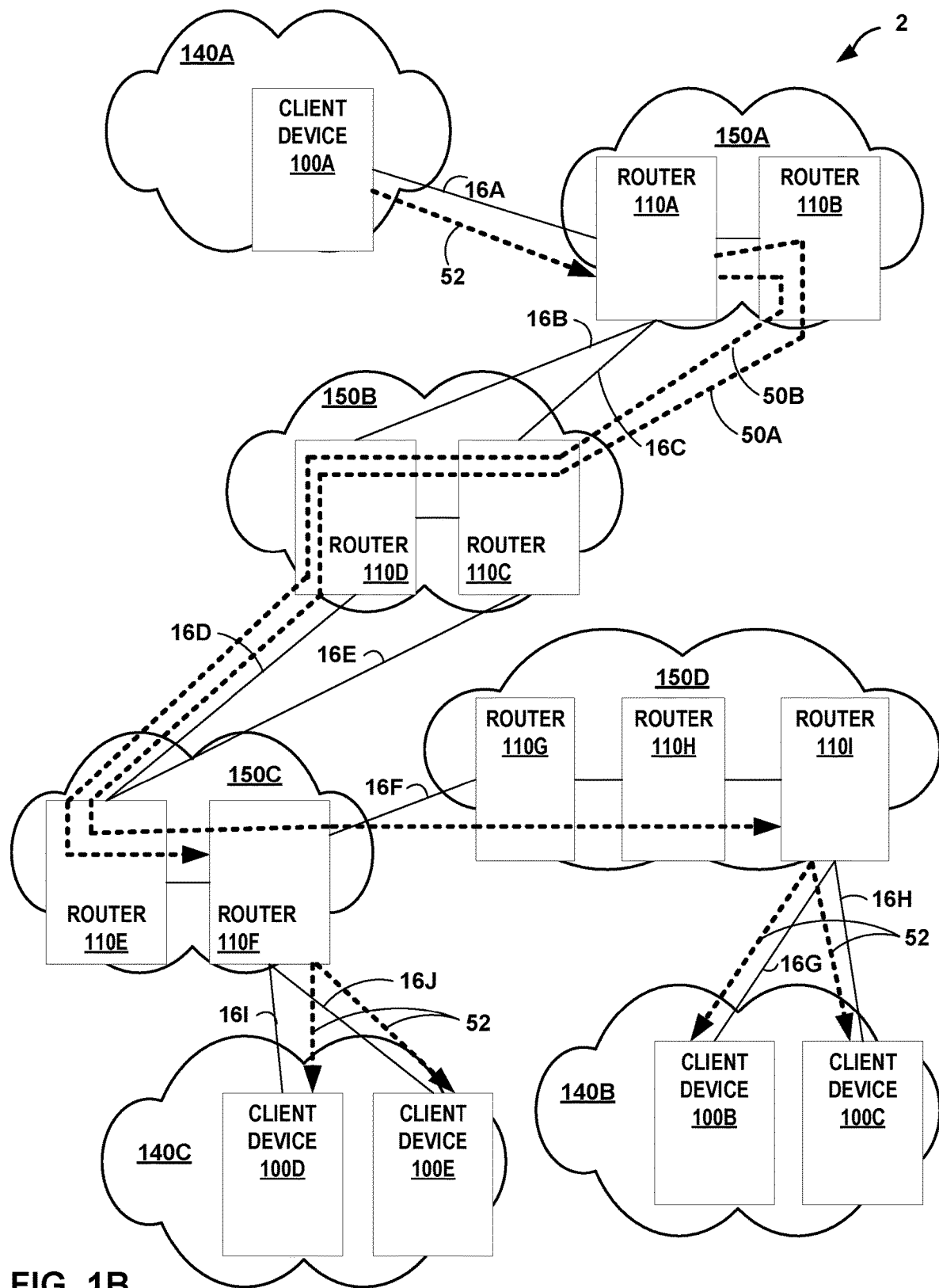

FIGS. 1A-1B are block diagrams illustrating an example computer network system 2 in accordance with the techniques of the disclosure. In the example of FIG. 1A, computer network system 2 includes service provider networks 150A-150D (collectively, "service provider networks 150") configured to provide Wide Area Network (WAN) connectivity to disparate customer networks 140A-140C ("customer networks 140"). Routers 110A-110I (collectively, "routers 110") of service provider networks 150 provide client devices 100A-100E (collectively, "client devices 100") associated with customer networks 140 with access to service provider networks 150. In some examples, customer networks 140 are enterprise networks. For ease of illustration, customer network 140A is depicted as having a single client device 100A, customer network 140B is depicted as having two client devices 100B-100C, and customer network 140C is depicted as having two client devices 100D-100E, but each of customer networks 140 may have any number of client devices. As depicted in the example of FIG. 1A, customer networks 140 are L2 computer networks, where reference to a layer followed by a number refers to a corresponding layer in the Open Systems Interconnection (OSI) model. L2 is also known as a "data link layer" in the OSI model and the term L2 may be used interchangeably with the phrase "data link layer" throughout this disclosure. Typically, customer networks 140 include many client devices 100, each of which may communicate across service provider networks 150 with one another as described in more detail below. Communication links 16A-16G (collectively, links "16") may be Ethernet, ATM or any other suitable network connections.

Routers 110 are illustrated as routers in the example of FIG. 1A. However, techniques of the disclosure may be implemented using any network device, such as switches, routers, gateways, or other suitable network devices that may send and receive network traffic. Customer networks 140 may be networks for geographically separated sites of an enterprise, for example. Each of customer networks 140 may include additional customer equipment, such as, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other routers not depicted in FIG. 1A. The configuration of computer network system 2 illustrated in FIG. 1A is merely an example. For example, computer network system 2 may include any number of customer networks 140. Nonetheless, for ease of description, only customer networks 140A-140C are illustrated in FIG. 1A.

Service provider networks 150 represent one or more publicly accessible computer networks that are owned and operated by one or more service providers. Although computer network system 2 is illustrated in the example of FIG. 1A as including multiple interconnected service provider networks 150, in other examples computer network system 2 may alternatively include a single service provider network that provides connectivity between customer networks 140. A service provider is usually a large telecommunications entity or corporation. Each of service provider networks 150 is usually a large L3 computer network. Each service provider network 150 is an L3 network in the sense that it natively supports L3 operations as described in the OSI model. Common L3 operations include those performed in accordance with L3 protocols, such as IP. L3 is also known as a "network layer" in the OSI model and the term L3 may be used interchangeably with the phrase "network layer" throughout this disclosure.

Although not illustrated, each service provider network 150 may be coupled to one or more networks administered by other providers, and may thus form part of a large-scale public network infrastructure, e.g., the Internet. Consequently, customer networks 140 may be viewed as edge networks of the Internet. Each service provider network 150 may provide computing devices within customer networks 140, such as client devices 100, with access to the Internet, and may allow the computing devices within customer networks 140 to communicate with each other.

Although additional routers are not shown for ease of explanation, it should be understood that system 2 may comprise additional network and/or computing devices such as, for example, one or more additional switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other routers. Moreover, although the elements of system 2 are illustrated as being directly coupled, it should be understood that one or more additional network elements may be included along any of network links 16, such that the network elements of system 2 are not directly coupled.

Each service provider network 150 typically provides a number of residential and business services for customer networks 140, including residential and business class data services (which are often referred to as "Internet services" in that these data services permit access to the collection of publicly accessible networks referred to as the Internet), residential and business class telephone and/or voice services, and residential and business class television services.

Session-Based Routing

In some examples, routers 110 may implement a stateful, session-based routing scheme that enables each router 110 to independently perform path selection and traffic engineering. The use of session-based routing may enable routers 110 to eschew the use of a centralized controller, such as a Software-Defined Networking (SDN) controller to perform path selection and traffic engineering. In this way, routers 110 may be more efficient and scalable for large networks where the use of an SDN controller would be infeasible. Furthermore, the use of session-based routing may enable routers 110 to eschew the use of tunnels, thereby saving considerable network resources by obviating the need to perform encapsulation and decapsulation at tunnel endpoints. In some examples, routers 110 implement session-based routing as Secure Vector Routing (SVR), provided by Juniper Networks, Inc.

In the example of FIG. 1A, client device 100A of system 2 establishes session 40 with client device 100B. Routers 110 facilitate establishment of session 40 by transporting network traffic between client device 100A and client device 100B. In some examples, client device 100A may be considered a "source" device in that client device 100A originates sessions 40 between client device 100A and client device 100B, e.g., client device 100A is the "source" of a first packet of a forward flow of the session. Session 40 includes a forward packet flow originating from client device 100A and destined for client device 100B and a reverse packet flow originating from client device 100B and destined for client device 100A. A forward flow for session 40 traverses a first path including, e.g., client device 100A, routers 110A-110I, and client device 100B. As described in more detail below, routers 110 enable the extension of customer network 140A, an L2 network, across service provider networks 150, e.g., L3 networks, to customer network 140n, another L2 network.

Client device 100A may establish session 40 with client device 100B according to one or more L2 communication session protocols, including Ethernet. As described in more detail below, customer network 140A may form a first L2 network and customer network 140B may form a second L2 network. Routers 110 operate to extend customer network 140A across service provider networks 150, which are one or more L3 networks, to customer network 140B. In this fashion, customer network 140A and customer network 140B may operate as if they were both part of the same L2 network, even though customer network 140A and customer network 140B may be logically isolated and geographically separate from one another. Furthermore, routers 110 may operate such that the existence of service provider networks 150 between customer network 140A and customer network 140B is transparent to client devices 100.

In some examples, routers 110 may extend session 40 as an L3 session across service provider networks 150 according to one or more L3 communication session protocols, including TCP or UDP, etc. For example, to establish session 40 according to TCP such that data may be exchanged according to TCP, router 110A and router 110B perform a three-way handshake. Router 110A sends a first packet comprising a "SYN" flag to router 110B. Router 110B acknowledges receipt of the first packet by responding to router 110A with a second packet comprising a "SYN-ACK" flag. Router 110A acknowledges receipt of the second packet by responding to router 110B with a third packet comprising an "ACK" flag. After sending the third packet, session 40 is established according to TCP and routers 110A, 110B may exchange data with one another (e.g., by transporting L2 data between client device 100A and client device 100B) via session 40. Additional example information regarding TCP is described in "TRANSMISSION CONTROL PROTOCOL," Request for Comments (RFC) 793, Internet Engineering Task Force (IETF), September 1981, available at https://tools.ietf.org/html/rfc793, the entire contents of which are incorporated herein by reference.

UDP is a connectionless protocol in that router 110A does not verify that router 110B is capable of receiving data prior to transmitting data. To establish session 40 according to UDP, router 110A transmits a first packet to router 110B. Session 40 may be considered "established" according to UDP upon receipt by router 110A of any packet from router 110B, which implies that router 110B successfully received the first packet from router 110A, responded, and router 110A was able to receive the response from router 110B. Additional example information regarding UDP is described in "User Datagram Protocol," RFC 768, IETF, Aug. 28, 1980, available at https://tools.ietf.org/html/rfc768, the entire contents of which are incorporated herein by reference.

In the example of FIG. 1A, when router 110A receives a packet for the forward packet flow originating from client device 100A and destined for client device 100B, router 110A determines whether the packet belongs to a new session (e.g., is the "first" packet or "lead" packet of session 40). In some examples, router 110A determines whether a source address, source port, destination address, destination port, and protocol of the first packet matches an entry in a session table.

If no such entry exists, router 110A determines that the packet belongs to a new session and creates an entry in the session table. Furthermore, if the packet belongs to a new session, router 110A may generate a session identifier for session 40. The session identifier may comprise, e.g., a source address and source port of client device 100A, a destination address and destination port of client device 100B, and a protocol used by the first packet. Router 110A may use the session identifier to identify subsequent packets as belonging to the same session.

In some examples, routers 110 perform stateful routing for session 40. For example, routers 110 may forward each packet of the forward packet flow of session 40 sequentially and along the same forward network path. As described herein, the "same" forward path may mean the same routers 110 that form a segment or at least a portion between a device originating the packet and a device to which the packet is destined (and not necessarily the entire network path between the device originating the packet and the device to which the packet is destined). Further, routers 110 forward each packet of the return flow of session 40 sequentially and along the same return network path. The forward network path for the forward packet flow of session 40 and the return network path of the return packet flow of session 40 may be the same path, or different paths. By ensuring that each packet of a flow is forwarded sequentially and along the same path, routers 110 maintain the state of the entire flow at each router 110, thereby enabling the use of stateful packet services, such as Deep Packet Inspection (DPI).

In the example of FIG. 1A, a stateful routing session may be established from ingress router 110A through intermediate routers 110B-110H to egress router 110I. In this example, router 110A determines that the first packet is an unmodified packet and the first packet of new session 40. Router 110A modifies the first packet to include metadata specifying the session identifier (e.g., the original source address, source port, destination address, and destination port). Router 110A replaces the header of the modified first packet to specify a source address that is an address of router 110A, a source port that is a port via which router 110A forwards the modified first packet toward client device 100B, a destination address that is an address of the next hop to which router 110A forwards the first packet (e.g., an address of router 110B), and a destination port that is a port of the next hop to which router 110A forwards the first packet (e.g., a port of router 110B).

Router 110A may further identify a network service associated with session 40. For example, router 110A may compare one or more of a source address, source port, destination address, or destination port for the session to a table of service address and port information to identify a service associated with the session. Examples of network services include Hypertext Transfer Protocol (HTTP), a firewall service, a proxy service, packet monitoring or metrics services, etc. For example, router 110A may determine that the forward packet flow of session 40 specifies a destination address and destination port assigned to client device 100B. Router 110A may thereafter store an association between session 40 with the identified network service. As another example, if the source port and/or destination port for session 40 is 80, router 110A may determine that session 40 is associated with an HTTP service. In other examples, router 110A may determine that one or more of a source address, source port, destination address, or destination port for session 40 belong to a block of address or ports indicative that a particular service is associated with session 40.

In some examples, router 110A uses the determined network service for session 40 to select a forward path for forwarding the first packet and each subsequent packet of the forward packet flow of session 40 toward client device 100B. In this fashion, router 110A may perform service-specific path selection to select a network path that best suits the requirements of the service. In contrast to a network topology that uses an SDN controller to perform path selection, each router 110 performs path selection. Further, the use of session-based routing enables each router 110 to make routing decisions at the service- or application-level, in contrast to conventional routers that are only able to make routing decisions at the flow level.

Router 110A forwards the modified first packet to router 110B. Additionally, router 110A stores the session identifier for session 40 such that, upon receiving subsequent packets for session 40, router 110A may identify the subsequent packets as belonging to the same session 40 and forward the subsequent packets along the same path as the first packet.

Intermediate router 110B receives the modified first packet and determines whether the modified first packet includes metadata specifying the session identifier. In response to determining that the modified first packet includes metadata specifying the session identifier, intermediate router 110B determines that router 110B is not an ingress device such that router 110B does not attach metadata specifying the session identifier.

As described above with respect to router 110A, router 110B determines whether the packet belongs to a new session (e.g., is the "first" packet or "lead" packet of the session) by determining whether a source address, source port, destination address, destination port, and protocol of the first packet matches an entry in a session table. If no such entry exists, router 110B determines that the packet belongs to a new session and creates an entry in the session table. Furthermore, if the packet belongs to a new session, router 110B generates a session identifier for the session. The session identifier used by router 110B to identify the session for the first packet may be different from the session identifier used by router 110A to identify the same session for the first packet, because each router 110A, 110B uses the header source address, source port, destination address, and destination port of the first packet to generate the session identifier, and this header information may be modified by each preceding router 110 as each router 110 forwards the first packet along the forward path. Furthermore, each router 110 may store this header information to identify a previous router 110 (or "waypoint") and a next router 110 (or "waypoint") such that each router 110 may reconstruct the same forward path and reverse path for each subsequent packet of the session.

Router 110B replaces the header of the modified first packet to specify a source address that is an address of router 110B, a source port that is a port via which router 110B forwards the modified first packet toward client device 100B, a destination address that is an address of the next hop to which router 110B forwards the first packet (e.g., an address of router 110C for session 40 along the first path), and a destination port that is a port of the next hop to which router 110B forwards the first packet (e.g., a port of router 110C). Router 110B forwards the modified first packet to router 110C. Additionally, router 110B stores the session identifier for the session such that, upon receiving subsequent packets for the session, router 110B may identify subsequent packets as belonging to the same session and forward the subsequent packets along the same path as the first packet.

Subsequent intermediate routers 110C-110H process the modified first packet in a similar fashion as routers 110A and 110B such that routers 110 forward the subsequent packets of the session along the same path as the first packet. Further, each router 110 stores a session identifier for the session, which may include an identification of the previous router 110 along the network path. Thus, each router 110 may use the session identifier to forward packets of the reverse packet flow for the session along the same network path back to client device 100.

A router 110 that may forward packets for a forward packet flow of the session to a destination for the packet flow is an egress, or "terminus" router. In the foregoing example, router 110I is a terminus router because router 110I may forward packets to client device 100B. Router 110I receives the modified first packet that comprises the metadata specifying the session identifier (e.g., the original source address, source port, destination address, and destination port). Router 110I identifies the modified first packet as destined for a service terminating at router 110I by determining that the destination source address and destination source port specified in the metadata of the modified lead packet corresponds to a destination reachable by router 110I (e.g., client device 100B). Router 110I recovers the original first packet by removing the metadata from the modified first packet and using the metadata to modify the header of the first packet to specify the original source address, source port, destination address, and destination port. Router 110I forwards the recovered first packet to client device 100B. The use of session-based routing may therefore form a series of waypoints (e.g., routers 110) interconnected by path "segments" (e.g., end-to-end route vectors between each waypoint).

Additional information with respect to session-based routing and SVR is described in U.S. Pat. No. 9,729,439, entitled "COMPUTER NETWORK PACKET FLOW CONTROLLER," and issued on Aug. 8, 2017; U.S. Pat. No. 9,729,682, entitled "NETWORK DEVICE AND METHOD FOR PROCESSING A SESSION USING A PACKET SIGNATURE," and issued on Aug. 8, 2017; U.S. Pat. No. 9,762,485, entitled "NETWORK PACKET FLOW CONTROLLER WITH EXTENDED SESSION MANAGEMENT," and issued on Sep. 12, 2017; U.S. Pat. No. 9,871,748, entitled "ROUTER WITH OPTIMIZED STATISTICAL FUNCTIONALITY," and issued on Jan. 16, 2018; U.S. Pat. No. 9,985,883, entitled "NAME-BASED ROUTING SYSTEM AND METHOD," and issued on May 29, 2018; U.S. Pat. No. 10,200,264, entitled "LINK STATUS MONITORING BASED ON PACKET LOSS DETECTION," and issued on Feb. 5, 2019; U.S. Pat. No. 10,277,506, entitled "STATEFUL LOAD BALANCING IN A STATELESS NETWORK," and issued on Apr. 30, 2019; U.S. Pat. No. 10,432,522, entitled "NETWORK PACKET FLOW CONTROLLER WITH EXTENDED SESSION MANAGEMENT," and issued on Oct. 1, 2019; and U.S. Patent Application Publication No. 2020/0403890, entitled "IN-LINE PERFORMANCE MONITORING," published on Dec. 24, 2020, the entire content of each of which is incorporated herein by reference in its entirety.

Exchanging Service and Topology State Information

In some examples, to implement session-based routing, each router 110 maintains a local repository of service and topology state information for each other router 110. The service and topology state information includes services reachable from each router 110, as well as a network topology from each router for reaching these services. Each router 110 may transmit changes in the services reachable from the router 110 and/or changes in the network topology for reaching the services from the router to a central repository, e.g., a server. Further, each router 110 may receive service and topology state information for each other router 110 in system 2 from the central repository.

In the foregoing example, router 110A receives a packet, determines session 40 for the forward packet flow comprising the packet, determines a service associated with session 40, and selects a network path for forwarding the packet. Router 110A may use its local copy of the service and topology state information for each router 110 to select the network path for forwarding the packet. For example, router 110A may use the identified service associated with the packet and a network topology for reaching the identified service to select a network path that comports with an SLA requirement or other session performance requirements for the service. Router 110A may then forward the packet and subsequent packets for the forward packet flow of session 40 along the selected path. In this fashion, router 110A may perform service-specific path selection in that router 110 may use criteria specific to the service associated with the packet to select a network path that best suits the requirements of the service.

In some examples, interfaces of routers 110 may be assigned to one or more "neighborhoods." A "neighborhood" is defined as a label applied to an interface of a router 110. The routers 110 within the same neighborhood are capable of forming a peering relationship with one another. For example, each router 110 having an interface to which a neighborhood label is applied is reachable over a Layer-3 network to each other router 110 having an interface to which the same neighborhood label is applied. In some examples, one or more neighborhoods may be aggregated into a "district." A district is a logical grouping of one or more neighborhoods. Typically, an Autonomous System (AS) (also referred to herein as an "Authority") may be divided into one or more districts, each district including one or more neighborhoods.

In some examples, each router 110 maintains a local repository of service and topology state information only for those other routers 110 within the same neighborhood. In some examples, each router 110 maintains a local repository of service and topology state information only for those other routers 110 within the same district of neighborhoods. As an example, each service provider network 150 may be considered to be a different "district," wherein each subdomain within each service provider network 150 may be considered to be a neighborhood within that district. In this example, each router 110A and 110B within service provider network 150A may maintain service and topology state information only for one another, and not for routers 110C-110I. Similarly, each router 110D and 110C within service provider network 150B may maintain service and topology state information only for one another, and not for routers 110A-110B or 110E-110I. In other examples, an administrator may assign one or more service provider networks 150 into one or more districts, one or more neighborhoods, or a combination of districts and neighborhoods as suits the needs of network system 2.

Additional information with respect to the exchange of service and topology state information is described in U.S. Patent Application Publication No. 2020/0366590, entitled "CENTRAL AUTHORITY FOR SERVICE AND TOPOLOGY EXCHANGE," published on Nov. 19, 2020; U.S. Patent Application Publication No. 2020/0366599, entitled "SOURCE-BASED ROUTING," published on Nov. 19, 2020; U.S. Patent Application Publication No. 2020/0366598, entitled "SERVICE AND TOPOLOGY EXCHANGE PROTOCOL," published on Nov. 19, 2020; U.S. Patent Application Publication No. 2020/0366589, entitled "ROUTING USING SEGMENT-BASED METRICS," published on Nov. 19, 2020; and U.S. patent application Ser. No. 16/050,722, entitled "NETWORK NEIGHBORHOODS FOR ESTABLISHING COMMUNICATION RELATIONSHIPS BETWEEN COMMUNICATION INTERFACES IN AN ADMINISTRATIVE DOMAIN," filed on Jul. 31, 2018, the entire content of each of which is incorporated herein by reference in its entirety.

Point-to-Point Layer-2 Network Extension Over Layer-3 Network Using Metadata

In some examples, computer network system 2 performs session-based routing over L2 customer networks 140 extended over L3 service provider networks 150. In one example, L2 customer network 140A connects client device 100A to router 110A, L2 customer network 140B connects client device 100B to router 110I, and L3 service provider networks 150 connect router 110A to router 110I via routers 110B-110H. Router 110A receives, from client device 100A, a unicast L2 frame destined for client device 110B. The L2 frame includes an L2 header and a payload. The L2 header specifies a source Media Access Control (MAC) address of client device 100A and a destination MAC address of client device 100B.

In some examples, the payload of the L2 frame may comprise a higher-level packet, such as an encapsulated L3 packet. For example, the L2 frame payload may comprise a session-based packet, such as an L3 packet such as a TCP/IP packet a UDP/IP packet, etc. As another example, the L2 frame payload may comprise a non-session-based packet, such as an Address Resolution Protocol (ARP) request, a Cisco Discovery Protocol (CDP) request, or a Link Layer Discovery Protocol (LLDP) request, etc. As another example, the L2 frame may comprise a VxLAN L2 frame with a payload comprising a non-IP packet. As another example, the L2 frame may comprise a VxLAN L2 frame with a payload comprising an IP packet.

In some examples, router 110A generates, in response to receiving the L2 frame, an L3 packet comprising an L3 header, a first portion of metadata comprising L2 address information for the first and second client devices, a second portion of metadata comprising L3 address information for the first and second client devices, and the payload. The L3 header may specify a source Internet Protocol (IP) address and a source port of router 110A and a destination IP address and a destination port of router 110B. The first portion of metadata may comprise the source MAC address of client device 100A and the destination MAC address of client device 100B obtained from the L2 frame. The second portion of metadata may comprise a source IP address and a source port of client device 100A that correspond to the source MAC address of client device 100A and a destination IP address and a destination port of client device 100B that correspond to the destination MAC address of client device 100B. Router 110A forwards, via L3 service provider network 150A, and to router 110B, the L3 packet including the first portion of metadata and second portion of metadata. Router 110B forwards the L3 packet to router 110C, which in turn forwards the L3 packet to router 110D, and so on, until the L3 packet reaches router 110I.

Because router 110A generates the L3 packet to include the first portion of metadata comprising the source MAC address of client device 100A and the destination MAC address of client device 100B obtained from the L2 frame, router 110I may use the first portion of metadata to generate, from the L3 packet, the L2 frame comprising the L2 header and the payload. Router 110I may thereafter forward, via L2 customer network 140B, the recovered L2 frame to client device 100B.

In some examples, router 110A uses the second portion of metadata as a session identifier to identify a session for the L3 packet, the session comprising a forward flow originating from client device 100A and destined for client device 100B and a reverse flow originating from client device 100B and destined for client device 100A. Router 110A may use this session identifier to perform session-based routing of the L3 packet across L3 service provider networks 150 and apply stateful routing services to the L3 packet as described above.

As further described below with respect to FIG. 1B, router 110A may generate, from a multipoint L2 frame, a unicast L3 packet that includes a first portion of metadata comprising the source MAC address of multipoint client device 100A and a destination MAC address of one or more multipoint receiver client devices 100B-100E obtained from the L2 frame and a second portion of metadata that comprises a session identifier for the multipoint L2 frame. Routers 110 may use the second portion of metadata that comprises the session identifier to perform session-based routing of the unicast L3 packet for the multipoint L2 frame. Further, routers 110F and 110I, which are connected via L2 customer networks 140B and 140C to client devices 100B-100E, may use the first portion of metadata of the unicast L3 packet to generate the multipoint L2 frame such that routers 110F and 110I may replicate the multipoint L2 frame to client devices 100B-100E.

In some examples, routers 110 may perform session-based routing of session-based L2 packets extended over Layer-3 networks using L2 metadata. Additional information with respect to performing session-based routing of session-based L2 packets extended over Layer-3 networks using L2 metadata is set forth in U.S. patent application Ser. No. 17/357,790 entitled "LAYER-2 NETWORK EXTENSION OVER LAYER-3 NETWORK USING LAYER-2 METADATA," filed on Jun. 24, 2021, the entire content of which is incorporated herein by reference in its entirety.

Point-to-Point Layer-2 Network Extension Over Layer-3 Network Using Encapsulation In some examples, computer network system 2 performs session-based routing of non-session-based L2 frames of L2 customer networks 140 extended over L3 service provider networks 150. In one example, L2 customer network 140A connects client device 100A to router 110A, L2 customer network 140B connects client device 100B to router 110I, and L3 service provider networks 150 connect router 110A to router 110I via routers 110B-110H. Router 110A receives, from client device 100A, a unicast L2 frame including an L2 header and a payload. In some examples, the L2 header comprises a source MAC address of client 100A and a destination MAC address of client 100B. In some examples, the L2 frame comprises an Ethernet frame.

In response to receiving the L2 frame, router 110A generates an L3 packet which encapsulates the L2 frame such that the L3 packet comprises an L3 header, a payload comprising the L2 frame, and metadata specifying a placeholder session identifier for the L2 frame. The L3 header specifies a 5-tuple comprising a source IP address and a source port of router 110A, a destination IP address and a destination port of a next-hop router 110 (e.g., router 110B), and a network protocol. In some examples, router 110A identifies an L3 network service associated with the L2 frame, and selects the network protocol of the L3 header based on the identified L3 network service associated with the L2 frame from a plurality of network protocols. In some examples, the L3 packet is a UDP packet and the network protocol is UDP. In other examples, the L3 packet is a TCP packet and the network protocol is TCP.

To perform session-based routing of the non-session-based L2 frame, router 110A generates a placeholder session identifier for the L2 frame. As discussed above, routers 110 may use a session identifier to identify a bidirectional session. The session identifier typically is a 5-tuple comprising a source IP address and port of the client device originating the session, a destination IP address and port of the destination client device, and a network protocol used by the session. This 5-tuple may be specified in an L3 header of an L3 packet received from the originating client device, or obtained from an L3 address translation of an L2 header of an L2 frame received from the originating client device. Routers 110 may use this session identifier to perform session-based routing of the L3 packet across the L3 network.

In some examples, router 110A determines whether the L2 frame comprises a non-session payload. In response to determining that the L2 frame comprises a non-session payload, router 110A generates a "placeholder" session identifier for the L3 packet to enable routers 110 of the L3 network to perform L3 session-based routing of the non-session-based L2 frames. The placeholder session identifier of the metadata of the L3 packet comprises, for example, a 5-tuple comprising a placeholder source IP address, a placeholder source port, a placeholder destination IP address, a placeholder destination port, and a first network protocol. In some examples, the placeholder source IP address is an IP address of a Local Area Network (LAN) interface with which router 110A receives the L2 frame and the placeholder source port is a port of the LAN interface with which router 110A receives the L2 frame. In some examples, the placeholder destination IP address is an IP address of a LAN interface of a next-hop router 110 (e.g., router 110B) to which router 110A forwards the L3 packet and the placeholder destination port is a port of the LAN interface of the next-hop router 110 (e.g., router 110B) to which router 110A forwards the L3 packet. In some examples, the network protocol is UDP, TCP, or other communication session protocols.

Because the non-session-based L2 frame does not include the L2 or L3 addressing information for both an originating device and a destination device, the placeholder session identifier generated by router 110A for the L2 frame may comprise, for example, a 5-tuple that may not correspond to either the 5-tuple of the L3 packet header or an L3 address translation of the L2 header of the L2 frame. In other words, unlike a session identifier for a session-based L2 or L3 packet, the placeholder session identifier for the non-session-based L2 frame may not necessarily correspond to an actual address of the source or destination of the L2 frame and may be arbitrary.

Router 110A forwards, via L3 service provider network 150A, and to router 110B (e.g., the next-hop router 110), the L3 packet which encapsulates the non-session-based L2 frame. Furthermore, router 110A stores the placeholder session identifier and an indication of the next-hop router (e.g., router 110B) in a table of session information. As described above, because routers 110 perform session-based routing, each router 110 replaces the L3 header with a source IP address and a source port of the current router 110 and a destination IP address and a destination port of the next-hop router 110. Additionally, each router 110 stores the placeholder session identifier and an indication of the next-hop router. For example, router 110B may replace the L3 header of the L3 packet with a new L3 header that specifies a source IP address and a source port of router 110B and a destination IP address and destination port of router 110C before forwarding the L3 packet to router 110C. Router 110B further stores the placeholder session identifier and an indication of the next-hop router (e.g., router 110C) in a table of session information. Router 110C, in turn, may replace the L3 header of the L3 packet with yet another new L3 header that specifies a source IP address and a source port of router 110C and a destination IP address and destination port of router 110D before forwarding the L3 packet to router 110D. Router 110C further stores the placeholder session identifier and an indication of the next-hop router (e.g., router 110D) in a table of session information. Each router 110 may perform these steps until router 110I receives the L3 packet. Router 110I decapsulates the L3 packet so as to recover the L2 frame from the payload of the L3 packet. Router 110I may thereafter forward, via L2 customer network 140B, the recovered L2 frame to client device 100B.

As further described below with respect to FIG. 1B, router 110A may generate, from a multipoint L2 frame destined to one or more multipoint receiver client devices 100B-100E, a unicast L3 packet that includes metadata comprising a placeholder session identifier for the multipoint L2 frame and an L3 payload encapsulating the multipoint L2 frame. Routers 110 may use the metadata comprising the placeholder session identifier to perform session-based routing of the unicast L3 packet for the multipoint L2 frame. Further, routers 110F and 110I, which are connected via L2 customer networks 140B and 140C to client devices 100B-100E, may decapsulate the unicast L3 packet to obtain the multipoint L2 frame such that routers 110F and 110I may replicate the multipoint L2 frame to client devices 100B-100E.

In some examples, routers 110 may perform session-based routing of non-session-based L2 frames extended over Layer-3 networks using encapsulation. Additional information with respect to performing session-based routing of non-session-based L2 frames extended over Layer-3 networks using encapsulation is set forth in U.S. patent application Ser. No. 17/357,763, entitled "LAYER-2 NETWORK EXTENSION OVER LAYER-3 NETWORK USING ENCAPSULATION," filed on Jun. 24, 2021, the entire content of which is incorporated herein by reference in its entirety.

Point-to-Multipoint Layer-2 Network Extension Over Layer-3 Network

In accordance with the techniques of the disclosure, routers 110 perform session-based routing of multipoint L2 frames extended over L3 service provider networks 150. As depicted in the example of FIG. 1B, client device 100A is connected to router 110A via L2 customer network 140A. Router 110A operates as an ingress router into L3 service provider networks 150 for L2 network traffic received from client device 100A. Router 110F is connected to client devices 100D-100E via L2 customer network 140C and router 110I is connected to client devices 100B-100C and via L2 customer network 140B. Router 110F operates as an egress router from L3 service provider networks 150 for L3 network traffic destined for client devices 100D-100E. Router 110I operates as an egress router from L3 service provider networks 150 for L3 network traffic destined for client devices 100B-100C.

In the example of FIG. 1B, client device 100A forwards multipoint L2 frame 52 to router 110A. Multipoint L2 frame 52 specifies a source MAC address of client device 100A and a multipoint destination MAC address specifying client devices 100B-100E. In some examples, multipoint L2 frame 52 is an Ethernet broadcast frame, an unknown unicast Ethernet frame, or an Ethernet multicast frame. In this example, client device 100A operates as a multipoint source device and client devices 100B-100E operate as multipoint receiver devices.

In a typical implementation of an L2 network extended over an L3 network, an ingress router which receives a multipoint L2 frame encapsulates the multipoint L2 frame with an L3 packet, and forwards a copy of the L3 packet toward each receiver device to which the multipoint L2 frame is destined. However, where multiple receiver devices are connected to the same egress router of the L3 network, such a conventional router forwards multiple, redundant copies of the same L3 packet to the same egress router. This may cause substantial consumption of resources of the L3 network, especially where a single multipoint L2 frame specifies a large number of receiver devices, each of which are connected to the same egress router.

In accordance with the techniques of the disclosure, ingress router 110A receives, from client device 100A, multipoint L2 frame 52. Multipoint L2 frame 52 comprises a multipoint source MAC specifying client device 100A and multipoint destination MAC address specifying client devices 100B-100E. As described in more detail below, ingress router 110A determines one or more egress routers 110 that are connected, via L2 customer networks 140, to the multipoint receiver devices specified by multipoint L2 frame 52. For example, with respect to FIG. 1B, ingress router 110A determines that router 110F is an egress router for customer devices 100D-100E and router 110I is an egress router for customer devices 100B-100C.

In some examples, to determine the one or more egress routers 110 that are connected to the multipoint receiver devices specified by multipoint L2 frame 52, ingress router 110A maintains a list of source bridges and corresponding egress routers 110 that are connected to receiver devices associated with the source bridge. In this example, ingress router 110A cross references a source bridge specified by multipoint L2 frame 52 with a corresponding entry within the stored list of source bridges to determine those egress routers 110 that are connected to receiver devices associated with the source bridge specified by multipoint L2 frame 52.

In some examples, to determine the one or more egress routers 110 that are connected to the multipoint receiver devices specified by multipoint L2 frame 52, ingress router 110A queries a central repository (not depicted in FIGS. 1A-1B), such as a server, that maintains a repository of service and topology state information for each router 110. Ingress router 110A obtains information specifying the one or more egress routers 110 that are connected to the multipoint receiver devices specified by multipoint L2 frame 52.

In some examples, to determine the one or more egress routers 110 that are connected to the multipoint receiver devices specified by multipoint L2 frame 52, ingress router 110A generates a unicast L3 packet for multipoint L2 frame 52 (as described in more detail below) and floods the unicast L3 packet to each router 110 of service provider networks 150. In some examples, ingress router 110A generates the unicast L3 packet and floods the unicast L3 packet to only those routers 110 that are connected to an L2 customer network 140 associated with a source bridge specified by multipoint L2 frame 52.

In some examples, to determine the one or more egress routers 110 that are connected to the multipoint receiver devices specified by multipoint L2 frame 52, ingress router 110A determines that a multipoint destination MAC addresses specified by multipoint L2 frame 52 includes a MAC address for an unknown receiver device (e.g., such as where multipoint L2 frame 52 is an unknown unicast Ethernet frame). In response to determining that the multipoint destination MAC addresses includes a MAC address for an unknown receiver device, ingress router 110A performs MAC learning to identify the unknown receiver device. For example, ingress router 110A may perform MAC learning by generating a unicast L3 packet encapsulating an L2 packet that includes an ARP request using the techniques described above for session-based routing of non-session-based L2 packets using encapsulation. As another example, ingress router 110A may perform MAC learning via Border Gateway Protocol (BGP). Through the process of MAC learning, ingress router 110A may identify the unknown receiver device. Further, when using, e.g., ARP, only the unknown receiver device responds to the ARP request. This further means that only the egress router 110 connected to the unknown receiver device forwards the ARP response such that ingress router 110A may store an indication that the egress router 110 forwarding the ARP response is connected to the (now identified) unknown receiver device. Ingress router 110A may thereafter forward, to the egress router 110 forwarding the ARP response, the unicast L3 packet for multipoint L2 frame 52.

Ingress router 110A forms a different unicast session with each egress router 110 determined to be connected to at least one receiver device. For example, ingress router 110A generates first unicast L3 packet 50A for multipoint L2 frame 52 and sends unicast L3 packet 50A toward egress router 110I. First unicast L3 packet 50A comprises an L3 header, a session identifier for first unicast L3 packet 50A, and an L3 payload. The L3 header specifies a source IP address and a source port of ingress router 110A and a destination IP address and a destination port of a next-hop peer router 110 (e.g., router 110B) that is a next hop toward egress router 110I. The session identifier identifies a session between ingress router 110A and egress router 110I. Ingress router 110A forwards first unicast L3 packet 50A to router 110B, which in turn forwards first unicast L3 packet 50A to router 110C, and so on, until egress router 110I receives first unicast L3 packet 50A. Egress router 110I generates, in response to receiving first unicast L3 packet 50A, multipoint L2 frame 52 and replicates multipoint L2 frame 52 to client devices 100B and 100C.

In some examples, ingress router 110A generates unicast L3 packet 50A using the foregoing techniques for point-to-point L2 network extension over L3 networks using metadata. For example, router 110A may generate, from multipoint L2 frame 52, unicast L3 packet 50A that includes a first portion of metadata and a second portion of metadata. The first portion of metadata comprises the source MAC address of multipoint client device 100A and a destination MAC address of multipoint receiver client devices 100B-100E obtained from the L2 frame. The second portion of metadata comprises a session identifier for multipoint L2 frame 52. Routers 110 may use the second portion of metadata that comprises the session identifier to perform session-based routing of unicast L3 packet 50A for multipoint L2 frame 52. Further, router 110I, which is connected via L2 customer network 140B to client devices 100B-100C, may use the first portion of metadata of unicast L3 packet 50A to generate multipoint L2 frame 52 such that router 110I may replicate multipoint L2 frame 52 to client devices 100B-100C.

In some examples, ingress router 110A generates unicast L3 packet 50A using the foregoing techniques for point-to-point L2 network extension over L3 networks using encapsulation. For example, router 110A may generate, from multipoint L2 frame 52 destined to multipoint receiver client devices 100B-100E, unicast L3 packet 50A that includes metadata comprising a placeholder session identifier for multipoint L2 frame 52 and an L3 payload encapsulating multipoint L2 frame 52. Routers 110 may use the metadata comprising the placeholder session identifier to perform session-based routing of unicast L3 packet 50A for multipoint L2 frame 52. Further, router 110I, which is connected via L2 customer network 140B to client devices 100B-100C, may decapsulate unicast L3 packet 50A to obtain multipoint L2 frame 52 such that router 110I may replicate multipoint L2 frame 52 to client devices 100B-100C.

Additionally, ingress router 110A generates second unicast L3 packet 50B for multipoint L2 frame 52 and sends unicast L3 packet 50B toward egress router 110F. Second unicast L3 packet 50B comprises an L3 header, a session identifier for second unicast L3 packet 50B, and an L3 payload. The L3 header specifies a source IP address and a source port of ingress router 110A and a destination IP address and a destination port of a next-hop peer router 110 (e.g., router 110B) that is a next hop toward egress router 110F. The session identifier identifies a session between ingress router 110A and egress router 110F. Ingress router 110A forwards second unicast L3 packet 50B to router 110B, which in turn forwards second unicast L3 packet 50B to router 110C, and so on, until egress router 110F receives second unicast L3 packet 50B. Egress router 110F generates, in response to receiving second unicast L3 packet 50B, multipoint L2 frame 52 and replicates multipoint L2 frame 52 to client devices 100D and 100E in a similar fashion as described above with respect to router 110I.

Therefore, as depicted by the foregoing example, multipoint L2 frame 52 is destined to four receiver devices (e.g., client devices 100B-100E). However, in accordance with the techniques of the disclosure, ingress router 110A generates only two unicast L3 packet 50A-50B (e.g., each corresponding to a respective egress router 110F, 110I). Thus, ingress router 110A may selectively forward the unicast L3 packet to only those egress routers that are connected to receiver client devices, thereby avoiding flooding L3 packets corresponding to multipoint L2 packet 52 to every router 110 of L3 service provider networks 150. Therefore, ingress router 110A may substantially reduce the quantity of L3 packets generated in response to receiving multipoint L2 frame 52 (e.g., by reducing the number of L3 packets from one L3 packet for each L2 multipoint receiver to one L3 packet for each L3 egress router 110 connected to at least one L2 multipoint receiver).

Accordingly, the techniques of the disclosure may enable ingress router 110A to receive multipoint L2 frame 52 and forward only a single L3 packet for the multipoint frame for each egress router 110 that is connected to at least one receiver device of the multipoint L2 frame. Thus, such routers operating as described herein may reduce the number of L3 packets replicated for the multipoint L2 frame, thereby reducing the L3 traffic forwarded across L3 service provider networks 150 when extending multipoint L2 traffic across service provider networks 150. Accordingly, routers operating as described herein may reduce the consumption of resources and increasing the scalability of the L3 network when extending multipoint L2 traffic. Additionally the techniques disclosed herein may enable the application of L3 traffic engineering, and in particular, session-based routing techniques, such as traffic engineering, failover operations, and stateful services, to multipoint L2 traffic. Therefore, the techniques of the disclosure may improve the reliability and redundancy of multipoint L2 frames for an L2 network extended across an L3 network. Further, such techniques as described herein may provide greater efficiency and scalability to L2 networks extended across L3 networks.

The techniques of the disclosure may further enable the extension of multipoint L2 traffic for an L2 network across an L3 network without the use of tunnels or packet encapsulation. For example, the techniques described herein may allow a router to forward L3 packets for multipoint L2 frames across an L3 network without the use of tunnels, such as GRE, to encapsulate an L2/L3 packet inside another IP packet for transport across an IP network. Therefore, by eliminating the overhead associated with the use of tunnels and/or encapsulation, the techniques of the disclosure may substantially reduce network congestion and resource consumption of L2 networks extended across L3 networks, as well as improve network latency and bandwidth in such networks. Furthermore, by eliminating the need to use tunnels or encapsulation to extend L2 networks across L3 networks, the techniques of the disclosure may obviate the need to use customer edge devices to translate L2 customer traffic within L2 networks into L3 traffic suitable for forwarding across an L3 service provider network.

Figure 2:
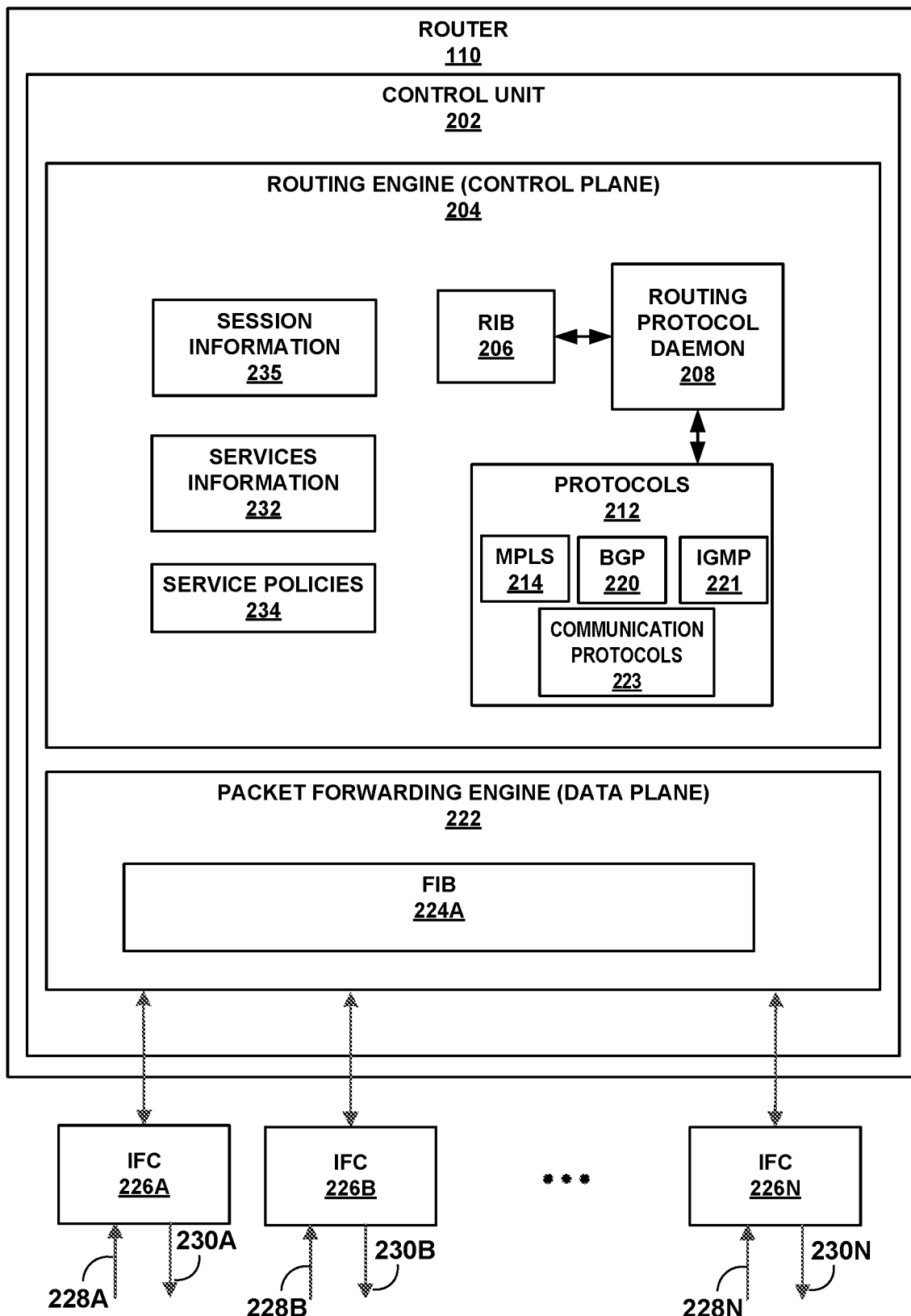
FIG. 2 is a block diagram illustrating an example router in accordance with the techniques of the disclosure.

FIG. 2 is a block diagram illustrating an example router 110 in accordance with the techniques of the disclosure. In general, router 110 may be an example of one of routers 110 of FIGS. 1A-1B. In this example, router 110 includes interface cards 226A-226N ("IFCs 226") that receive packets via incoming links 228A-228N ("incoming links 228") and send packets via outbound links 230A-230N ("outbound links 230"). IFCs 226 are typically coupled to links 228, 230 via a number of interface ports. Router 110 also includes a control unit 202 that determines routes of received packets and forwards the packets accordingly via IFCs 226.

Control unit 202 may comprise routing engine 204 and packet forwarding engine 222. Routing engine 204 operates as the control plane for router 110 and includes an operating system that provides a multi-tasking operating environment for execution of a number of concurrent processes. Routing engine 204 communicates with other routers, e.g., such as routers 110 of FIGS. 1A-1B, to establish and maintain a computer network, such as computer network system 2 of FIGS. 1A-1B, for transporting network traffic between one or more customer devices. Routing protocol daemon (RPD) 208 of routing engine 204 executes software instructions to implement one or more control plane networking protocols 212. For example, protocols 212 may include one or more routing protocols, such as Internet Group Management Protocol (IGMP) 221 and/or BGP 220, for exchanging routing information with other routing devices and for updating routing information base (RIB) 206, Multiprotocol Label Switching (MPLS) protocol 214, and other routing protocols. Protocols 212 may further include one or more communication session protocols, such as TCP, UDP, TLS, or ICMP.

RIB 206 may describe a topology of the computer network in which router 110 resides, and may also include routes through the shared trees in the computer network. RIB 206 describes various routes within the computer network, and the appropriate next hops for each route, i.e., the neighboring routing devices along each of the routes. Routing engine 204 analyzes information stored in RIB 206 and generates forwarding information for forwarding engine 222, stored in Forwarding information base (FIB) 224. FIB 224 may associate, for example, network destinations with specific next hops and corresponding IFCs 226 and physical output ports for output links 230. FIB 224 may be a radix tree programmed into dedicated forwarding chips, a series of tables, a complex database, a link list, a radix tree, a database, a flat file, or various other data structures.

FIB 224 may also include lookup structures. Lookup structures may, given a key, such as an address, provide one or more values. In some examples, the one or more values may be one or more next hops. A next hop may be implemented as microcode, which when executed, performs one or more operations. One or more next hops may be "chained," such that a set of chained next hops perform a set of operations for respective different next hops when executed. Examples of such operations may include applying one or more services to a packet, dropping a packet, and/or forwarding a packet using an interface and/or interface identified by the one or more next hops.

Session information 235 stores information for identifying sessions. In some examples, session information 235 is in the form of a session table. For example, services information 232 comprises one or more entries that specify a session identifier. In some examples, the session identifier comprises one or more of a source address, source port, destination address, destination port, or protocol associated with a forward flow and/or a reverse flow of the session. As described above, when routing engine 204 receives a packet for a forward packet flow originating from client device 100A and destined for client device 100B of FIGS. 1A-1B, routing engine 204 determines whether the packet belongs to a new session (e.g., is the "first" packet or "lead" packet of session 40). To determine whether the packet belongs to a new session, routing engine 204 determines whether session information 235 includes an entry corresponding to a source address, source port, destination address, destination port, and protocol of the first packet. If an entry exists, then the session is not a new session. If no entry exists, then the session is new and routing engine 204 generates a session identifier for the session and stores the session identifier in session information 235. Routing engine 204 may thereafter use the session identifier stored in session information 235 for the session to identify subsequent packets as belonging to the same session.

Services information 232 stores information that routing engine 204 may use to identify a service associated with a session. In some examples, services information 232 is in the form of a services table. For example, services information 232 comprises one or more entries that specify a service identifier and one or more of a source address, source port, destination address, destination port, or protocol associated the service. In some examples, routing engine 204 may query services information 232 with one or more of a source address, source port, destination address, destination port, or protocol of a session for a received packet to determine a service associated with a session. For example, routing engine 204 may determine a service identifier based on a correspondence of a source address, source port, destination address, destination port, or protocol in services information 232 to a source address, source port, destination address, destination port, or protocol specified by a session identifier. Routing engine 204 retrieves, based on the service associated with the packet, one or more service policies 234 corresponding to the identified service. The service policies may include, e.g., a path failover policy, a Dynamic Host Configuration Protocol (DHCP) marking policy, a traffic engineering policy, a priority for network traffic associated with the session, etc. Routing engine 204 applies, to the packet, the one or more service policies 234 that correspond to the service associated with the packet.

In accordance with the techniques of the disclosure, router 110 performs session-based routing of multipoint L2 frames of an L2 network extended over L3 networks. In some examples, router 110 operates as an example of ingress router 110A of FIGS. 1A-1B.

For example, control unit 202 receives, from source client device 100A, multipoint L2 frame 52. Multipoint L2 frame 52 specifies a source MAC address of client device 100A and a multipoint destination MAC address specifying client devices 100B-100E. In some examples, multipoint L2 frame 52 is an Ethernet broadcast frame, an unknown unicast Ethernet frame, or an Ethernet multicast frame. In this example, client device 100A operates as a multipoint source device and client devices 100B-100E operate as multipoint receiver devices.

Control unit 202 determines one or more egress routers 110 connected to at least one receiver client device of receiver client devices 100B-100E. With respect to the example of FIGS. 1A-1B, ingress router 110A identifies routers 110F and 110I as egress routers that are connected to receiver client devices 100B-100E.

In some examples, to determine the one or more egress routers 110 that are connected to the multipoint receiver devices specified by multipoint L2 frame 52, control unit 202 maintains, in session information 235, a list of source bridges and corresponding egress routers 110 that are connected to receiver devices associated with the source bridge. In this example, control unit 202 cross references a source bridge specified by multipoint L2 frame 52 with a corresponding entry within the stored list of source bridges of session information 235 to determine those egress routers 110 that are connected to receiver devices associated with the source bridge specified by multipoint L2 frame 52.

In some examples, to determine the one or more egress routers 110 that are connected to the multipoint receiver devices specified by multipoint L2 frame 52, control unit 202 queries a central repository (not depicted in FIGS. 1A-1B), such as a server, that maintains a repository of service and topology state information for each router 110. Control unit 202 may query the central repository to obtain information specifying the one or more egress routers 110 that are connected to the multipoint receiver devices specified by multipoint L2 frame 52. Control unit 202 stores the information within session information 235, which may operate as a local repository of service and topology state information.

In some examples, to determine the one or more egress routers 110 that are connected to the multipoint receiver devices specified by multipoint L2 frame 52, control unit 202 may select each router 110. Control unit 202 generates a unicast L3 packet for multipoint L2 frame 52 and forwards the unicast L3 packet toward each router 110 (e.g., via one or more next-hop routers 110). This may also be referred to as "flooding" the unicast L3 packet to each router 110 of service provider networks 150. In some examples, control unit 202 generates the unicast L3 packet and floods the unicast L3 packet to only those routers 110 that are connected to an L2 customer network 140 associated with a source bridge specified by multipoint L2 frame 52 of session information 235. By flooding the unicast L3 packet to every router 110 within L3, service provider networks 150 control unit 202 may ensure that an egress router 110 connected to the unknown receiver device 100 may receive the unicast L3 packet and forward the corresponding multipoint L2 frame 52 to the unknown receiver device 100. If and when control unit 202 learns the MAC address for the unknown receiver device 100, control unit 202 may thereafter forward the unicast L3 packet only to the egress router 110 connected to the unknown receiver device 100 and avoid flooding the unicast L3 packet.

In some examples, to determine the one or more egress routers 110 that are connected to the multipoint receiver devices specified by multipoint L2 frame 52, control unit 202 determines that a multipoint destination MAC addresses specified by multipoint L2 frame 52 includes a MAC address for an unknown receiver device (e.g., such as where multipoint L2 frame 52 is an unknown unicast Ethernet frame). In response to determining that the multipoint destination MAC addresses includes a MAC address for an unknown receiver device, control unit 202 performs MAC learning to identify the unknown receiver device. For example, control unit 202 may perform MAC learning by generating a unicast L3 packet encapsulating an L2 packet that includes an ARP request using the techniques described above for session-based routing of non-session-based L2 packets using encapsulation. In other examples, control unit 202 may perform MAC learning via Border Gateway Protocol (BGP).

For example, control unit 202 may generate a second unicast L3 packet encapsulating an L2 packet comprising an ARP request. Control unit 202 may forward the second unicast L3 packet toward every router 110. An egress router connected to the unknown receiver device may decapsulate the L3 packet to obtain the L2 packet comprising the ARP request and forward the L2 packet comprising the ARP request to the unknown receiver device. The unknown receiver device may reply to the ARP request with a second L2 packet comprising a response to the ARP request specifying the MAC address of the unknown receiver device. The egress router receives the second L2 packet and encapsulates the second L2 packet with a third unicast L3 packet. The egress router then forwards, to router 110, the third unicast L3 packet comprising the second L2 packet containing the response to the ARP request. Control unit 202 receives the third unicast L3 packet and stores the MAC address of the unknown receiver device such that control unit 202 may forward the unicast L3 packet for the multipoint L2 frame 52 to the correct destination.

Through the process of MAC learning, control unit 202 may identify the unknown receiver device. Further, when using, e.g., ARP, only the unknown receiver device responds to the ARP request. This further means that only the egress router 110 connected to the unknown receiver device forwards the ARP response such that control unit 202 may store an indication that the egress router 110 forwarding the ARP response is connected to the (now identified) unknown receiver device. Control unit 202 may thereafter forward, to the egress router 110 forwarding the ARP response, the unicast L3 packet for multipoint L2 frame 52.

With respect to the example of FIGS. 1A-1B, control unit 202 generates, for each egress router 110 determined to be connected to at least one receiver client device of receiver client devices 100B-100E, a unicast L3 packet. For example, control unit 202 generates first unicast L3 packet 50A for multipoint L2 frame 52. First unicast L3 packet 50A comprises an L3 header, a session identifier for first unicast L3 packet 50A, and an L3 payload. The L3 header specifies a source IP address and a source port of ingress router 110A and a destination IP address and a destination port of a next-hop peer router 110 (e.g., router 110B) that is a next hop toward egress router 110I. The session identifier identifies a session between ingress router 110A and egress router 110I.

As a further example, control unit 202 generates second unicast L3 packet 50B for multipoint L2 frame 52. Second unicast L3 packet 50B comprises an L3 header, a session identifier for second unicast L3 packet 50B, and an L3 payload. The L3 header specifies a source IP address and a source port of ingress router 110A and a destination IP address and a destination port of a next-hop peer router 110 (e.g., router 110B) that is a next hop toward egress router 110F. The session identifier identifies a session between ingress router 110A and egress router 110F.

In some examples, control unit 202 generates the unicast L3 packet using the foregoing techniques for point-to-point L2 network extension over L3 networks using metadata. For example, control unit 202 generates the unicast L3 packet to include a first portion of metadata and a second portion of metadata. The first portion of metadata comprises a source MAC address of source client device 100A and a multipoint destination MAC address of receiver client devices 100B-100E. The second portion of metadata comprises the session identifier. Further, the L3 payload comprises the L2 payload of multipoint L2 frame 52.

In some examples, control unit 202 generates the unicast L3 packet using the foregoing techniques for point-to-Point L2 network extension over L3 networks using encapsulation. For example, control unit 202 generates the unicast L3 packet such that the session identifier for the unicast L3 packet comprises a placeholder session identifier for multipoint L2 frame 52. The placeholder session identifier comprises a placeholder source IP address, a placeholder source port, a placeholder destination IP address, a placeholder destination port, and a placeholder network protocol. Further, the L3 payload of the unicast L3 packet comprises multipoint L2 frame 52 such that the unicast L3 packet encapsulates multipoint L2 frame 52.

Control unit 202 forwards, toward each egress router 110 determined to be connected to the one or more receiver client devices 100B-100E, the unicast L3 packet via L3 service provider networks 150. For example, control unit 202 forwards, via IFCs 226, first unicast L3 packet 50A to router 110B, which in turn forwards first unicast L3 packet 50A to router 110C, and so on, until egress router 110I receives first unicast L3 packet 50A. As a further example, control unit 202 forwards, via IFCs 226, second unicast L3 packet 50B to router 110B, which in turn forwards second unicast L3 packet 50B to router 110C, and so on, until egress router 110F receives second unicast L3 packet 50B.

In some examples, router 110 operates as an example of one of egress routers 110F, 110I of FIGS. 1A-1B. For convenience, the following example is described with respect to egress router 110I of FIGS. 1A-1B. However, router 110 may operate as egress router 110F, or any other egress router, in a substantially similar fashion.

In this example, control unit 202 receives, from, e.g., router 110H, unicast L3 packet 50A. Unicast L3 packet 50A comprises an L3 header, a session identifier for unicast L3 packet 50A, and an L3 payload. The L3 header specifies a source IP address and a source port of the previous-hop router 110 (e.g., router 110H) and a destination IP address and a destination port of one of IFCs 226 (e.g., operating as egress router 110I). The session identifier identifies a session between ingress router 110A and router 110 (e.g., operating as egress router 110I).

In some examples, control unit 202 generates multipoint L2 frame 52 from unicast L3 packet 50A using the foregoing techniques for point-to-point L2 network extension over L3 networks using metadata. For example, unicast L3 packet 50A comprises an L3 packet that includes a first portion of metadata comprising a source MAC address of source client device 100A and a multipoint destination MAC address of receiver client devices 100B-100E. Control unit 202 generates, based on the source MAC address of source client device 100A and the multipoint destination MAC address of receiver client devices 100B-100E of the first portion of metadata and the L3 payload of unicast L3 packet 50A, multipoint L2 frame 52.

In some examples, control unit 202 generates multipoint L2 frame 52 from unicast L3 packet 50A using the foregoing techniques for point-to-point L2 network extension over L3 networks using encapsulation. For example, unicast L3 packet 50A comprises a placeholder session identifier for multipoint L2 frame 52 and an L3 payload encapsulating the multipoint L2 frame 52. Control unit 202 obtains, from the L3 payload of unicast L3 packet 50A, multipoint L2 frame 52.

Control unit 202 forwards, via IFCs 226, multipoint L2 frame 52 to each multipoint receiver device to which router 110 is connected. For example, control unit 202 replicates multipoint L2 frame 52 to client deice 100B and 100C via L2 customer network 140B.

Figure 3A:
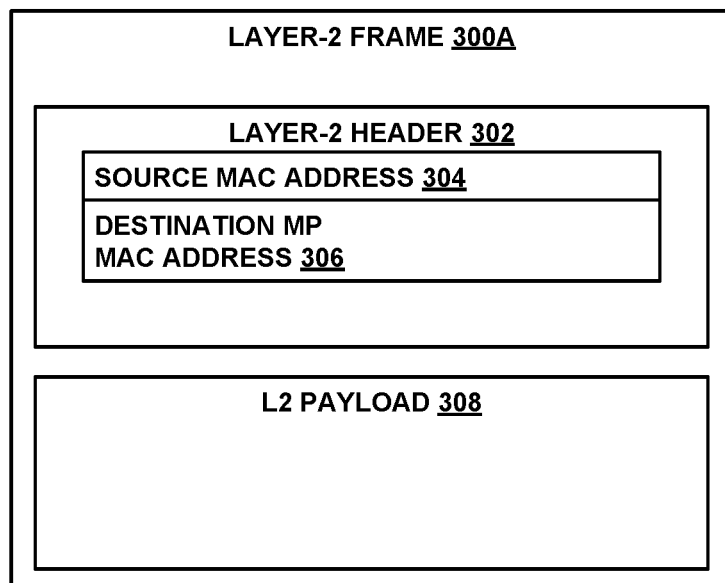
FIGS. 3A-3C are block diagrams illustrating a data structure for a multipoint L2 frame and a data structure for a unicast L3 packet generated from the multipoint L2 frame in accordance with the techniques of the disclosure.
Figure 3B:
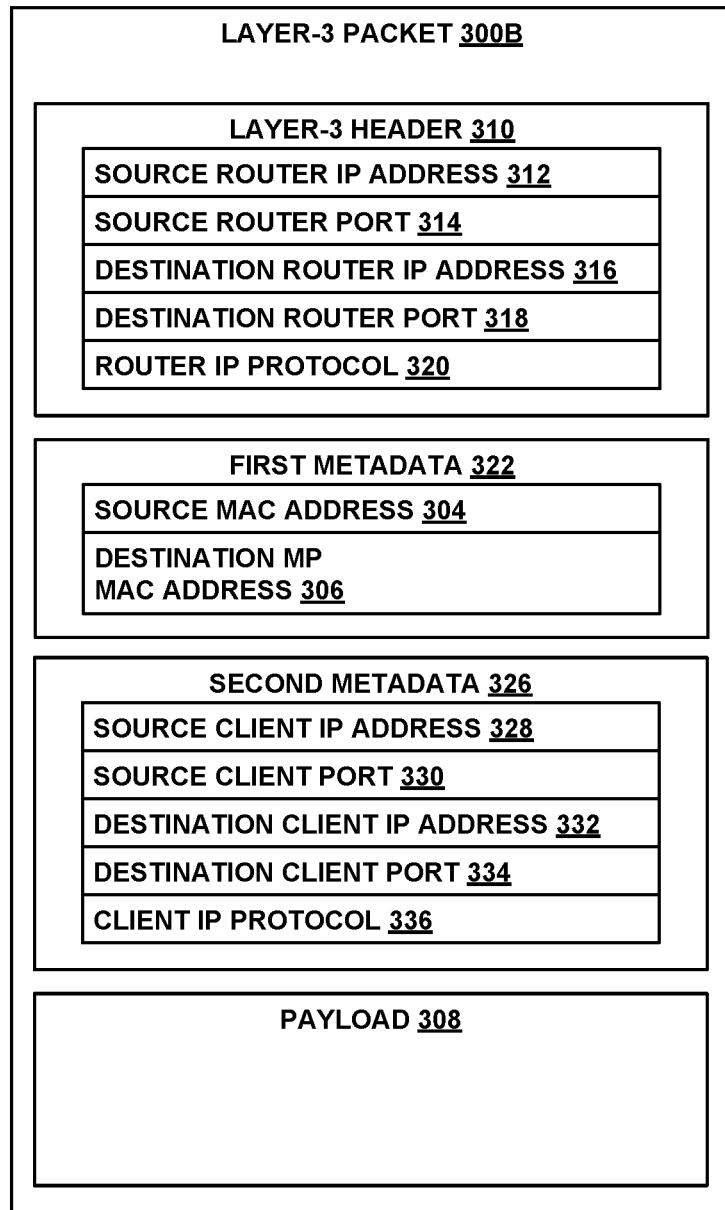
Figure 3C:
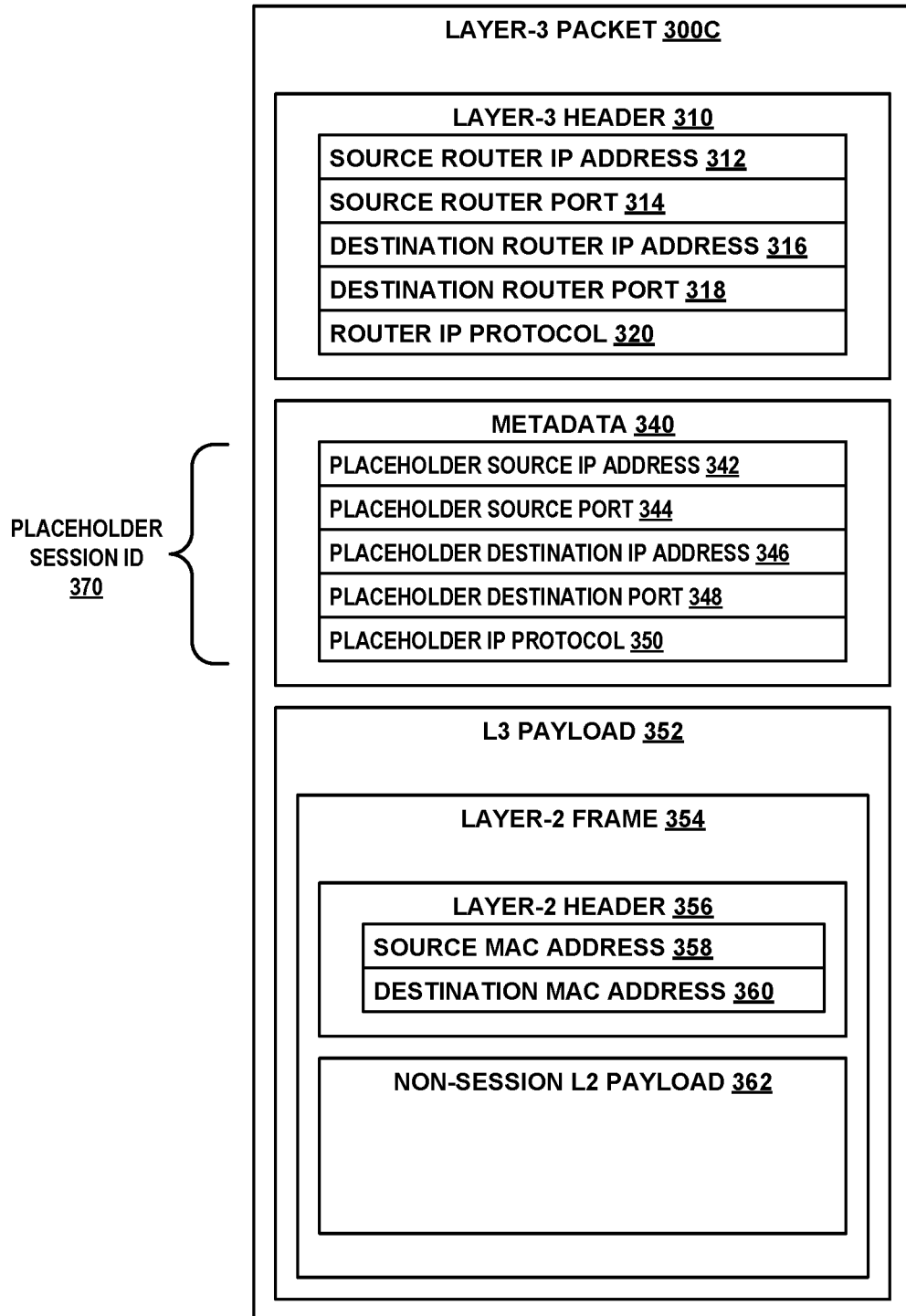

FIGS. 3A-3C are block diagrams illustrating a data structure for a multipoint L2 frame and a data structure for a unicast L3 packet generated from the multipoint L2 frame in accordance with the techniques of the disclosure.

FIG. 3A is a block diagram illustrating a data structure for multipoint L2 frame 300A. In some examples, multipoint L2 frame 300A comprises a multipoint Ethernet frame, such as an Ethernet broadcast frame, an unknown unicast Ethernet frame, or an Ethernet multicast frame. Multipoint L2 frame 300A includes L2 header 302 and data payload 308. In some examples, L2 header 302 specifies source MAC address 304 indicative of a device originating multipoint L2 frame 300A and destination multipoint MAC address 306 indicative of one or more devices to which multipoint L2 frame 300A is destined. In some examples, multipoint L2 frame 300A comprises an Ethernet frame.

In some examples where multipoint L2 frame 300A is an Ethernet frame, multipoint L2 frame 300A may additionally include a preamble, an EtherType, and a frame check sequence (not depicted in FIG. 3A). In some examples, L2 header 302 includes an IEEE 802.1Q VLAN tag that specifies a VLAN to which multipoint L2 frame 300A belongs. In some examples, L2 header 302 includes an IEEE 802.1ad Q-in-Q tag that specifies multiple "stacked" VLANs to which multipoint L2 frame 300A belongs.

As described above with reference to FIGS. 1A-1B, in some examples, router 110A receives multipoint L2 frame 300A from client device 100A. In this example, source MAC address 304 specifies a MAC address of client device 100A and destination multipoint MAC address 306 specifies one or more client devices 100B-100D.

Multipoint L2 frame 300A is depicted for illustrative purposes only. The techniques of the disclosure may apply to other types of L2 frames that use different formats than the format depicted in FIG. 3A.

FIG. 3B is a block diagram illustrating a data structure for unicast L3 packet 300B generated from multipoint L2 frame 300A in accordance with the techniques of the disclosure. unicast L3 packet 300B includes L3 header 310, a first portion of metadata (first metadata 322), a second portion of metadata (second metadata 326), and data payload 308.

L3 header 310 specifies source router IP address 312 indicative of a device originating unicast L3 packet 300B, source port 314 indicative of a port of the originating device from which unicast L3 packet 300B egresses, destination router IP address 316 indicative of a device to which unicast L3 packet 300B is destined, destination port 318 indicative of a port of destination device to which unicast L3 packet 300B is destined, and router IP protocol 320, which specifies a protocol used by unicast L3 packet 300B. In some examples, router IP protocol 320 specifies one of TCP or UDP.

First metadata 322 comprises source MAC address 304 indicative of the device originating multipoint L2 frame 300A and multipoint destination MAC address 324 indicative of one or more device to which multipoint L2 frame 300A is destined. As described above, router 110A of FIGS. 1A-1B may generate a different unicast L3 packet 300B for each peer router 110 that includes at least one destination device specified by destination MAC address 306 of multipoint L2 frame 300A.

Source MAC address 304 and destination multipoint MAC address 306 of first metadata 322 of unicast L3 packet 300B correspond to source MAC address 304 and destination multipoint MAC address 306 of L2 header 302 of multipoint L2 frame 300A.

In some examples, first metadata 322 may further specify other information (not expressly depicted in FIG. 3B) that may be used by routers 110F, 100I to recover multipoint L2 frame 300A from unicast L3 packet 300B and forward multipoint L2 frame 300A to client devices 100B-100E. For example, first metadata 322 may specify a Virtual Local Area Network (VLAN) tag for a VLAN to which client devices 100B-100E are assigned. In some examples, first metadata 322 may specify a Virtual eXtensible Local Area Network (VXLAN) tag for a VXLAN to which client devices 100B-100E are assigned. In some examples, first metadata 322 may specify a VLAN Q-in-Q tag stack comprising a plurality of VLAN tags for multiple stacked VLANs to which client devices 100B-100E are assigned. In some examples, first metadata 322 may specify a bridge identifier for a destination bridge for multipoint L2 frame 300A.

Second metadata 326 specifies source client IP address 328, source client port 330, destination client IP address 332, destination client port 324, and client IP protocol 336. Source client IP address 328 and source client port 330 together comprise L3 address information corresponding to source MAC address 304 of the device originating multipoint L2 frame 300A. Destination client IP address 332 and destination client port 334 together comprise L3 address information corresponding to destination multipoint MAC address 306 of the one or more devices to which multipoint L2 frame 300A is destined. In some examples, destination client IP address 332 is a multipoint IP address. Client IP protocol 336 specifies a protocol used by source client IP address 328, source client port 330, destination client IP address 332, and destination client port 334. In some examples, client IP protocol 336 specifies one of TCP or UDP.

In accordance with the techniques of the disclosure, an ingress router may generate, in response to receiving multipoint L2 frame 300A, one unicast L3 packet 300B for each egress router which is connected to at least one multipoint receiver device specified by destination multipoint MAC address 306 of multipoint L2 frame 300A. With respect to the example of FIGS. 1A-1B, router 110A receives multipoint L2 frame 300A, wherein destination multipoint MAC address 306 specifies client devices 100B-100E as multipoint receivers, with router 110I being connected to client devices 100B-100C via L2 customer network 140B and router 110F being connected to client devices 100D-100E via L2 customer network 140C. Router 110A generates a first unicast L3 packet 300B for forwarding to router 110I and a second unicast L3 packet 300B for forwarding to router 110F.

In the foregoing example, source router IP address 312 and source port 314 specify an IP address of router 110A and port used by router 110A to forward unicast L3 packet 300B, respectively. Destination router IP address 316 and destination port 318 specify an IP address and port of router 110B to which unicast L3 packet 300B is destined, respectively. Routers 110F, 110I of FIGS. 1A-1B may use first metadata 322 to recover multipoint L2 frame 300A from unicast L3 packet 300B for forwarding to client devices 100B-100E. Additionally, routers 110 of FIGS. 1A-1B may use second metadata 320 as a session identifier to identify a session associated with multipoint L2 frame 300A and/or unicast L3 packet 300B so as to perform session-based routing of multipoint L2 frame 300A and/or unicast L3 packet 300B.

FIG. 3C is a block diagram illustrating a data structure for unicast L3 packet 300C generated for non-session-based L2 frame 354 in accordance with the techniques of the disclosure. Unicast L3 packet 300C includes L3 header 310, metadata 340, and L3 data payload 352. L3 data payload 352 comprises non-session-based L2 frame 354 such that unicast L3 packet 300C encapsulates multipoint L2 frame 300A.

L3 header 310 specifies source router IP address 312 indicative of a device originating unicast L3 packet 300C, source port 314 indicative of a port of the originating device from which unicast L3 packet 300C egresses, destination router IP address 316 indicative of a device to which unicast L3 packet 300C is destined, destination port 318 indicative of a port of destination device to which unicast L3 packet 300C is destined, and router IP protocol 320, which specifies a protocol used by unicast L3 packet 300C. In some examples, router IP protocol 312 specifies one of TCP or UDP.

As described above with reference to FIGS. 1A-1B, in some examples, router 110A generates unicast L3 packet 300C in response to receiving non-session-based L2 frame 354. In some examples, router 110A generates L2 frame 354 in response to receiving a multipoint L2 frame, such as multipoint L2 frame 300A and determining that destination multipoint MAC address 306 includes one or more MAC addresses for unknown receiver devices. Router 110A may therefore generate unicast L3 packet 300C and/or non-session-based L2 frame 354 to resolve the one or more MAC addresses for the unknown receiver devices. In some examples, non-session payload 362 of non-session-based L2 frame 354 comprises an ARP request, a CDP request, or an LLDP request.

As described above with reference to FIGS. 1A-1B, in some examples, router 110A generates unicast L3 packet 300C in response to receiving non-session-based L2 frame 354. In this example, source router IP address 312 and source port 314 specify an IP address of router 110A and port used by router 110A to forward unicast L3 packet 300C, respectively. Destination router IP address 316 and destination port 318 specify an IP address and port of router 110B to which unicast L3 packet 300C is destined, respectively.

Metadata 340 specifies placeholder session identifier 370, which comprises placeholder source IP address 342, placeholder source port 344, placeholder destination IP address 346, placeholder destination port 348, and placeholder IP protocol 350. In some examples, placeholder source IP address 342 is an IP address of a LAN interface with which router 110A of FIGS. 1A-1B receives L2 frame 354 and placeholder source port 344 is a port of the LAN interface with which router 110A receives L2 frame 354. In some examples, placeholder destination IP address 346 is an IP address of a LAN interface of a next-hop router 110 (e.g., router 110B) to which router 110A forwards unicast L3 packet 300C and placeholder destination port 334828 is a port of the LAN interface of the next-hop router 110 (e.g., router 110B) to which router 110A forwards unicast L3 packet 300C. In some examples, placeholder network protocol 350 is UDP. In other examples, placeholder network protocol 350 is TCP. As described above, routers 110 of FIGS. 1A-1B may use placeholder session identifier 370 to perform session-based routing of L2 frame 352 and/or unicast L3 packet 300C, even where L2 frame 352 is a non-session-based L2 frame that comprises non-session-based payload 362.

Figure 4:
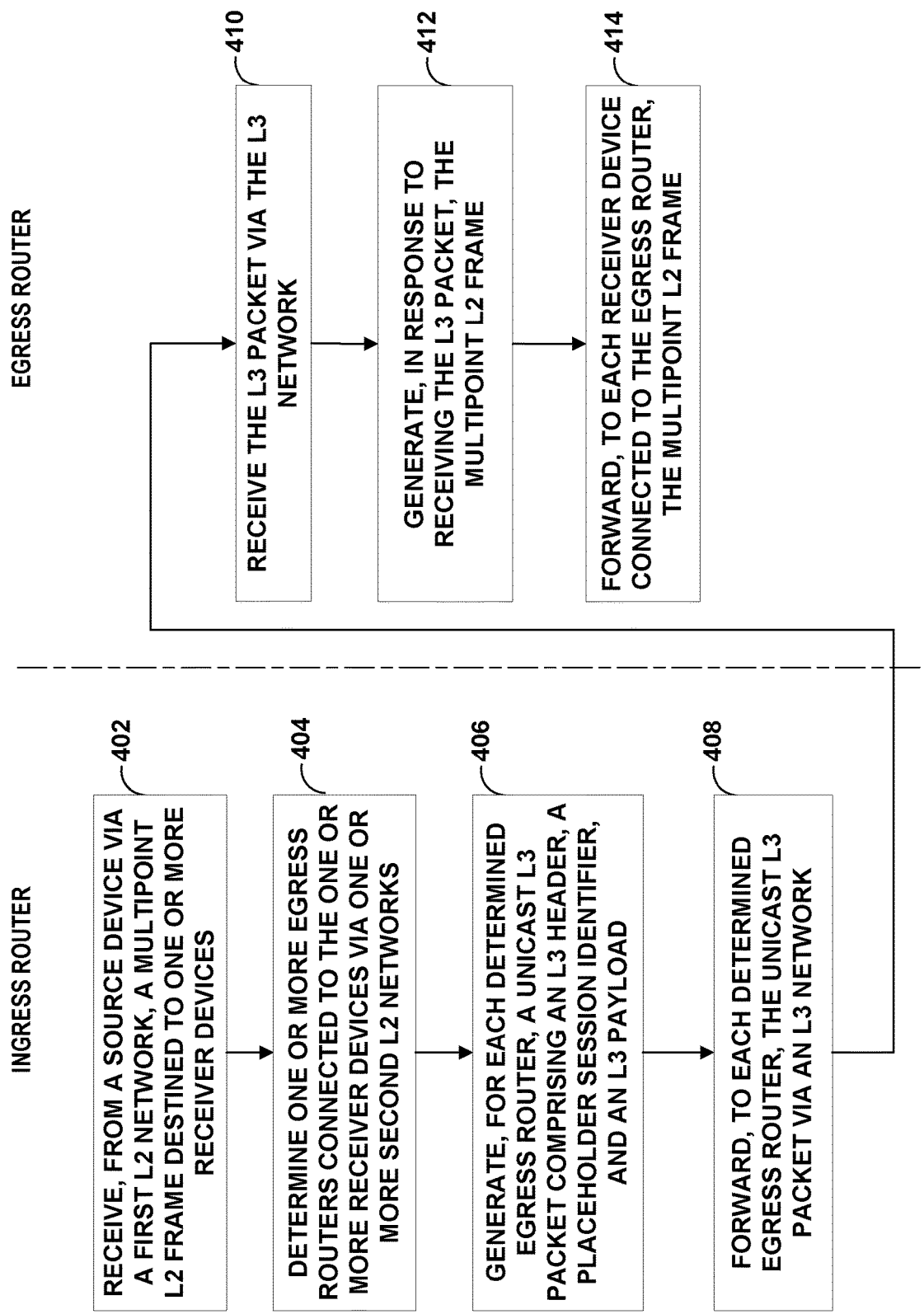
FIG. 4 is a flowchart illustrating an example operation in accordance with the techniques of the disclosure.

FIG. 4 is a flowchart illustrating an example operation in accordance with the techniques of the disclosure. FIG. 4 is described with respect to FIGS. 1A-1B for convenience.

Ingress router 110A receives, from source client device 100A, multipoint L2 frame 52 (402). Multipoint L2 frame 52 specifies a source MAC address of client device 100A and a multipoint destination MAC address specifying receiver client devices 100B-100E. In some examples, multipoint L2 frame 52 is an Ethernet broadcast frame, an unknown unicast Ethernet frame, or an Ethernet multicast frame. In this example, client device 100A operates as a multipoint source device and client devices 100B-100E operate as multipoint receiver devices.

Ingress router 110A determines one or more egress routers 110 connected to at least one receiver client device of receiver client devices 100B-100E (404). For example, ingress router 110A identifies routers 110F and 110I as egress routers that are connected to receiver client devices 100B-100E.

Ingress router 110A generates, for each egress router 110 determined to be connected to at least one receiver client device of receiver client devices 100B-100E, a unicast L3 packet (406). Further, ingress router 110A forwards, to each egress router 110 determined to be connected to the one or more receiver client devices 100B-100E, the unicast L3 packet via L3 service provider network 150 (408). For example, ingress router 110A generates first unicast L3 packet 50A for multipoint L2 frame 52 and sends unicast L3 packet 50A toward egress router 110I. First unicast L3 packet 50A comprises an L3 header, a session identifier for first unicast L3 packet 50A, and an L3 payload. The L3 header specifies a source IP address and a source port of ingress router 110A and a destination IP address and a destination port of a next-hop peer router 110 (e.g., router 110B) that is a next hop toward egress router 110I. The session identifier identifies a session between ingress router 110A and egress router 110I. Ingress router 110A forwards first unicast L3 packet 50A to router 110B, which in turn forwards first unicast L3 packet 50A to router 110C, and so on, until egress router 110I receives first unicast L3 packet 50A.

As a further example, ingress router 110A generates second unicast L3 packet 50B for multipoint L2 frame 52 and sends unicast L3 packet 50B toward egress router 110F. Second unicast L3 packet 50B comprises an L3 header, a session identifier for second unicast L3 packet 50B, and an L3 payload. The L3 header specifies a source IP address and a source port of ingress router 110A and a destination IP address and a destination port of a next-hop peer router 110 (e.g., router 110B) that is a next hop toward egress router 110F. The session identifier identifies a session between ingress router 110A and egress router 110F. Ingress router 110A forwards second unicast L3 packet 50B to router 110B, which in turn forwards second unicast L3 packet 50B to router 110C, and so on, until egress router 110F receives second unicast L3 packet 50B.

Each egress router 110 connected to at least one receiver client device of receiver client devices 100B-100E receives, the unicast L3 packet via L3 service provider network 150 (410). Further, the egress router 110 generates, in response to receiving the unicast L3 packet, multipoint L2 frame 52 (412) and forwards, to each receiver client device 100 connected to the egress router 110, multipoint frame 52 (414). For example, egress router 110I receives first unicast L3 packet 50A. Egress router 110I generates, in response to receiving first unicast L3 packet 50A, multipoint L2 frame 52. Further, egress router 110I replicates multipoint L2 frame 52 to client devices 100B and 100C. Additionally, egress router 110F receives second unicast L3 packet 50B. Egress router 110F generates, in response to receiving second unicast L3 packet 50B, multipoint L2 frame 52. Egress router 110F replicates multipoint L2 frame 52 to client devices 100D and 100E.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various examples have been described. These and other examples are within the scope of the following claims.

What is claimed is:

1. A method comprising:
   receiving, by an ingress router of a plurality of routers and from a source device connected to the ingress router via a first Open Systems Interconnection (OSI) Model Layer-2 (L2) network, a multipoint L2 frame destined for one or more receiver devices, the multipoint L2 frame comprising an L2 header and an L2 payload, wherein the plurality of routers form an OSI Model Layer-3 (L3) network;
   determining, by the ingress router and based on the L2 header of the multipoint L2 frame, one or more egress routers of the plurality of routers that are connected to the one or more receiver devices via one or more second L2 networks;
   generating, by the ingress router and for each egress router of the determined one or more egress routers that are connected to the one or more receiver devices, a unicast L3 packet comprising:
      an L3 header specifying a source Internet Protocol (IP) address and a source port of the ingress router and a destination IP address and a destination port of a next-hop peer router of the plurality of routers that is a next hop toward the respective egress router of the determined one or more egress routers;
      a session identifier for the unicast L3 packet, the session identifier identifying a session between the ingress router and the respective egress router of the determined one or more egress routers; and
      an L3 payload; and
   forwarding, by the ingress router, for each egress router of the determined one or more egress routers that are connected to the one or more receiver devices, and to the corresponding next-hop peer router of the plurality of routers, the generated unicast L3 packet corresponding to the respective egress router.

2. The method of claim 1, wherein the multipoint L2 frame comprises a multicast Ethernet frame.

3. The method of claim 1, wherein the multipoint L2 frame comprises a broadcast Ethernet frame.

4. The method of claim 1,
   wherein the multipoint L2 frame comprises a Media Access Control (MAC) address for an unknown receiver device of the one or more receiver devices,
   wherein determining the one or more egress routers of the plurality of routers that are connected to the one or more receiver devices Via one or more second L2 networks comprises selecting each router of the plurality of routers, wherein generating, for each egress router of the determined one or more egress routers that are connected to the one or more receiver devices, the unicast L3 packet comprises generating, for each router of the plurality of routers, the unicast L3 packet, and wherein forwarding, for each egress router of the determined one or more egress routers that are connected to the one or more receiver devices, and to the corresponding next-hop peer router of the plurality of routers, the generated unicast L3 packet corresponding to the respective egress router comprises forwarding, for each router of the plurality of routers, and to the corresponding next-hop peer router of the plurality of routers, the generated unicast L3 packet corresponding to the router of the plurality of routers.

5. The method of claim 1,
wherein the multipoint L2 frame comprises a Media Access Control (MAC) address for an unknown receiver device of the one or more receiver devices,
wherein determining the one or more egress routers of the plurality of routers that are connected to the one or more receiver devices via one or more second L2 networks comprises performing MAC learning to learn the MAC address for the unknown receiver device of the one or more receiver devices, and
wherein the method further comprises storing, by the ingress router, the MAC address for the receiver device.

6. The method of claim 5, wherein performing MAC learning to learn the MAC address for the unknown receiver device of the one or more receiver devices comprises:
generating, by the ingress router, a second unicast L3 packet encapsulating a first L2 packet comprising an Address Resolution Protocol (ARP) request; and
receiving, by the ingress router, a third unicast L3 packet encapsulating a second L2 packet comprising a response to the ARP request, the response comprising the MAC address for the receiver device of the one or more receiver devices.

7. The method of claim 1,
wherein the unicast L3 packet further comprises a first portion of metadata and a second portion of metadata,
wherein the first portion of metadata comprises a source Media Access Control (MAC) address of the source device and a multipoint destination MAC address of the one or more receiver devices,
wherein the second portion of metadata comprises the session identifier, and
wherein the L3 payload comprises the L2 payload.

8. The method of claim 1,
wherein the session identifier for the unicast L3 packet comprises a placeholder session identifier for the multipoint L2 frame, wherein the placeholder session identifier comprises a placeholder source IP address, a placeholder source port, a placeholder destination IP address, a placeholder destination port, and a placeholder network protocol, and
wherein the L3 payload of the unicast L3 packet comprises the multipoint L2 frame.

9. The method of claim 1,
wherein the one or more receiver devices comprise a first receiver device and a second receiver device,
wherein determining the one or more egress routers of the plurality of routers that are connected to the one or more receiver devices via one or more second L2 networks comprises:
determining a first egress router of the plurality of routers that is connected to the first receiver device via the one or more L2 networks; and
determining a second egress router of the plurality of routers that is connected to the first receiver device via the one or more L2 networks, and
wherein generating, for each egress router of the determined one or more egress routers that are connected to the one or more receiver devices, a unicast L3 packet comprises generating a first unicast L3 packet and a second unicast L3 packet, and
wherein forwarding the generated unicast L3 packet comprises:
forwarding, to a first next-hop peer router for the first egress router, the first L3 packet; and
forwarding, to a second next-hop peer router for the second egress router, the second L3 packet.

10. An ingress router of a plurality of routers, the ingress router comprising processing circuitry configured to:
receive, from a source device connected to the ingress router via a first Open Systems interconnection (OSI) Model Layer-2 (L2) network, a multipoint L2 frame destined for one or more receiver devices, the multipoint L2 frame comprising an L2 header and an L2 payload, wherein the plurality of routers form an OSI Model Layer-3 (L3) network;
determine, based on the L2 header of the multipoint L2 frame, one or more egress routers of the plurality of routers that are connected to the one or more receiver devices via one or more second L2 networks;
generate, for each egress router of the determined one or more egress routers that are connected to the one or more receiver devices, a unicast L3 packet comprising:
an L3 header specifying a source Internet Protocol (IP) address and a source port of the ingress router and a destination IP address and a destination port of a next-hop peer router of the plurality of routers that is a next hop toward the respective egress router of the determined one or more egress routers;
a session identifier for the unicast L3 packet, the session identifier identifying a session between the ingress router and the respective egress router of the determined one or more egress routers; and
an L3 payload; and
forward, for each egress router of the determined one or more egress routers that are connected to the one or more receiver devices, and to the corresponding next-hop peer router of the plurality of routers, the generated unicast L3 packet corresponding to the respective egress router.

11. The ingress router of claim 10, wherein the multipoint L2 frame comprises a multicast Ethernet frame.

12. The ingress router of claim 10, wherein the multipoint L2 frame comprises a broadcast Ethernet frame.

13. The ingress router of claim 10,
wherein the multipoint L2 frame comprises a Media Access Control (MAC) address for an unknown receiver device of the one or more receiver devices,
wherein to determine the one or more egress routers of the plurality of routers that are connected to the one or more receiver devices via one or more second L2 networks, the processing circuitry is configured to perform MAC learning to learn the MAC address for the unknown receiver device of the one or more receiver devices, and wherein the ingress router further comprises a storage device configured to store the MAC address for the unknown receiver device.

14. The ingress router of claim 10, wherein the unicast L3 packet further comprises a first portion of metadata and a second portion of metadata, wherein the first portion of metadata comprises a source Media Access Control (MAC) address of the source device and a multipoint destination MAC address of the one or more receiver devices, wherein the second portion of metadata comprises the session identifier, and wherein the L3 payload comprises the L2 payload.

15. The ingress router of claim 10, wherein the session identifier for the unicast L3 packet comprises a placeholder session identifier for the multipoint L2 frame, wherein the placeholder session identifier comprises a placeholder source IP address, a placeholder source port, a placeholder destination IP address, a placeholder destination port, and a placeholder network protocol, and wherein the L3 payload of the unicast L3 packet comprises the multipoint L2 frame.

16. A method comprising:

receiving, by an egress router of a plurality of routers and from a previous-hop router of the plurality of routers that is a previous hop toward an ingress router of the plurality of routers, a unicast an Open Systems Interconnection (OSI) Model Layer-3 (L3) packet, wherein the plurality of routers form an L3 network, and wherein the unicast L3 packet comprises:

an L3 header specifying a source Internet Protocol (IP) address and a source port of the previous-hop router and a destination IP address and a destination port of the egress router;

a session identifier for the unicast L3 packet, the session identifier identifying a session between the ingress router and the egress router; and an L3 payload; and generating, in response to receiving the unicast L3 packet, a multipoint OSI Model Layer-2 (L2) frame destined for one or more receiver devices connected to the egress router via an L2 network, the multipoint L2 frame comprising an L2 header and an L2 payload; and forwarding, by the egress router and to each receiver device of the one or more receiver devices, the multipoint L2 frame.

17. The method of claim 16, wherein the multipoint L2 frame comprises a multicast Ethernet frame.

18. The method of claim 16, wherein the multipoint L2 frame comprises a broadcast Ethernet frame.

19. The method of claim 16, wherein the unicast L3 packet further comprises a first portion of metadata and a second portion of metadata, wherein the first portion of metadata comprises a source Media Access Control (MAC) address of the source device and a multipoint destination MAC address of the one or more receiver devices, wherein the second portion of metadata comprises the session identifier, wherein the L3 payload comprises the L2 payload, and wherein generating the multipoint L2 frame comprises generating, based on the source MAC address and multipoint destination MAC address of the first portion of metadata and the L2 payload of the L3 payload, the multipoint L2 frame.

20. The method of claim 16, wherein the session identifier for the unicast L3 packet comprises a placeholder session identifier for the multipoint L2 frame, wherein the placeholder session identifier comprises a placeholder source IP address, a placeholder source port, a placeholder destination IP address, a placeholder destination port, and a placeholder network protocol, wherein the L3 payload of the unicast L3 packet comprises the multipoint L2 frame, and wherein generating the multipoint L2 frame comprises obtaining, from the L3 payload of the L3 packet, the multipoint L2 frame.

\* \* \* \* \*